US007765957B2

(12) United States Patent
Behravesh et al.

(10) Patent No.: US 7,765,957 B2
(45) Date of Patent: Aug. 3, 2010

(54) PET COLLAR

(76) Inventors: Arash Behravesh, 3364 2nd. St. S., Arlington, VA (US) 22204; Rebecca S. Behravesh, 3364 2nd. St. S., Arlington, VA (US) 22204

( * ) Notice: Subject to any disclaimer, the term of this patent is extended or adjusted under 35 U.S.C. 154(b) by 75 days.

(21) Appl. No.: 12/146,558

(22) Filed: Jun. 26, 2008

(65) Prior Publication Data

US 2009/0000569 A1    Jan. 1, 2009

Related U.S. Application Data

(60) Provisional application No. 60/946,167, filed on Jun. 26, 2007.

(51) Int. Cl.
*A01K 15/04* (2006.01)
(52) U.S. Cl. .................................................. 119/815
(58) Field of Classification Search ................. 119/814, 119/815, 823, 855, 856
See application file for complete search history.

(56) References Cited

U.S. PATENT DOCUMENTS

| 2,806,471 | A | * | 9/1957 | Breese | 602/17 |
| 3,013,530 | A | * | 12/1961 | Zeman | 119/815 |
| 3,024,784 | A | * | 3/1962 | Monfardini | 602/18 |
| 3,036,554 | A | * | 5/1962 | Johnson | 119/821 |
| 3,387,588 | A | * | 6/1968 | Bird | 119/760 |
| 4,200,057 | A | * | 4/1980 | Agar | 424/9.8 |
| 5,197,414 | A | * | 3/1993 | Kanakura | 119/839 |
| 5,211,474 | A | * | 5/1993 | Leitner et al. | 362/351 |
| 5,349,927 | A | * | 9/1994 | Campbell | 119/815 |
| 5,697,328 | A | * | 12/1997 | Hunter | 119/714 |
| 5,797,354 | A | * | 8/1998 | Marschall | 119/815 |
| D419,716 | S | * | 1/2000 | Parrochia | D26/118 |
| 6,244,222 | B1 | * | 6/2001 | Bowen | 119/856 |
| D506,296 | S | * | 6/2005 | Driver | D30/152 |
| 7,617,800 | B2 | * | 11/2009 | Trescott | 119/815 |

* cited by examiner

*Primary Examiner*—Rob Swiatek
*Assistant Examiner*—Ebony Evans
(74) *Attorney, Agent, or Firm*—Arash Behravesh

(57) ABSTRACT

A barrier capable of being removably secured to a protective collar. The barrier can include a fastener and a partition, wherein the fastener is capable of positioning the partition inside the protective collar or about an outer arcuating edge of the protective collar.

15 Claims, 22 Drawing Sheets

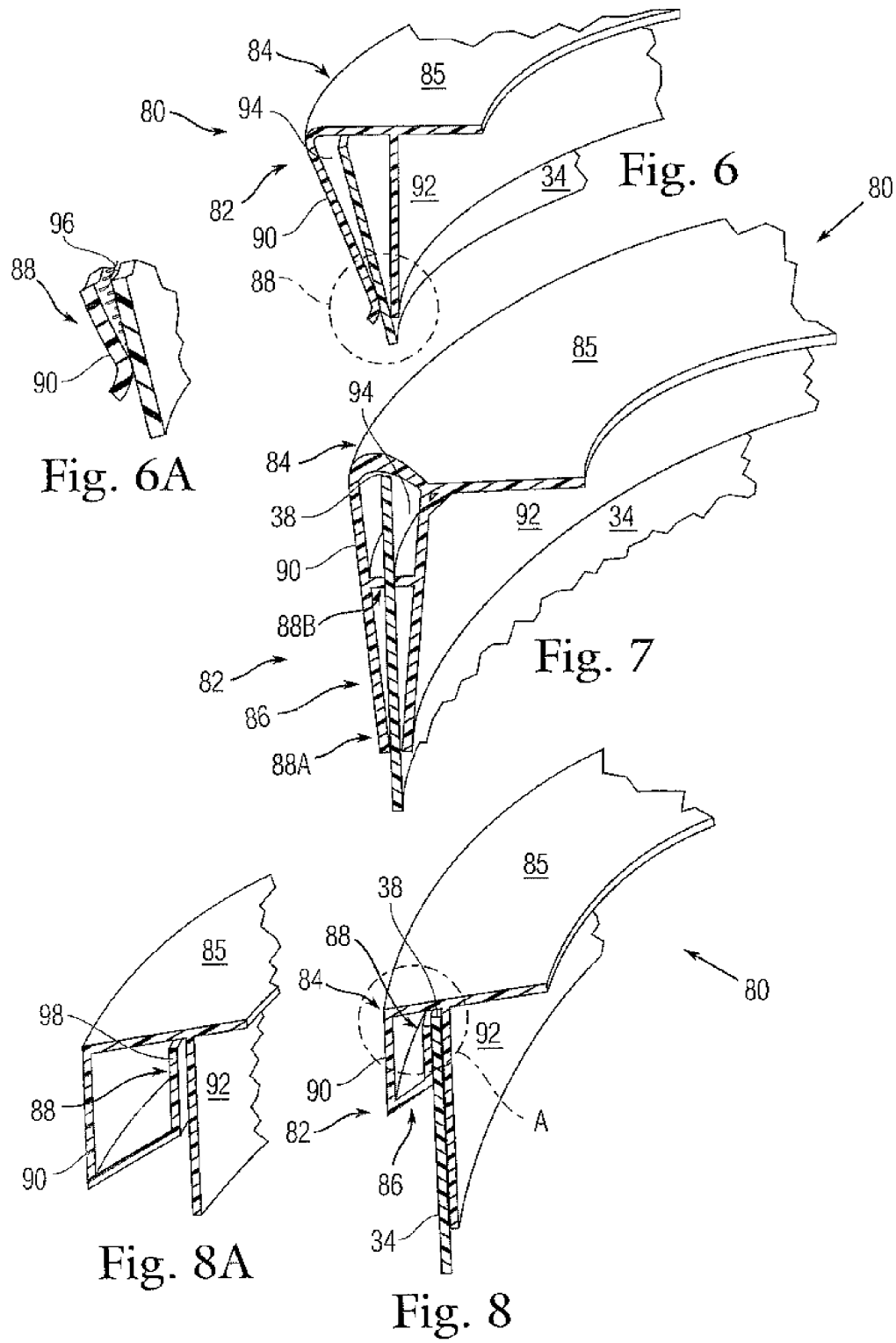

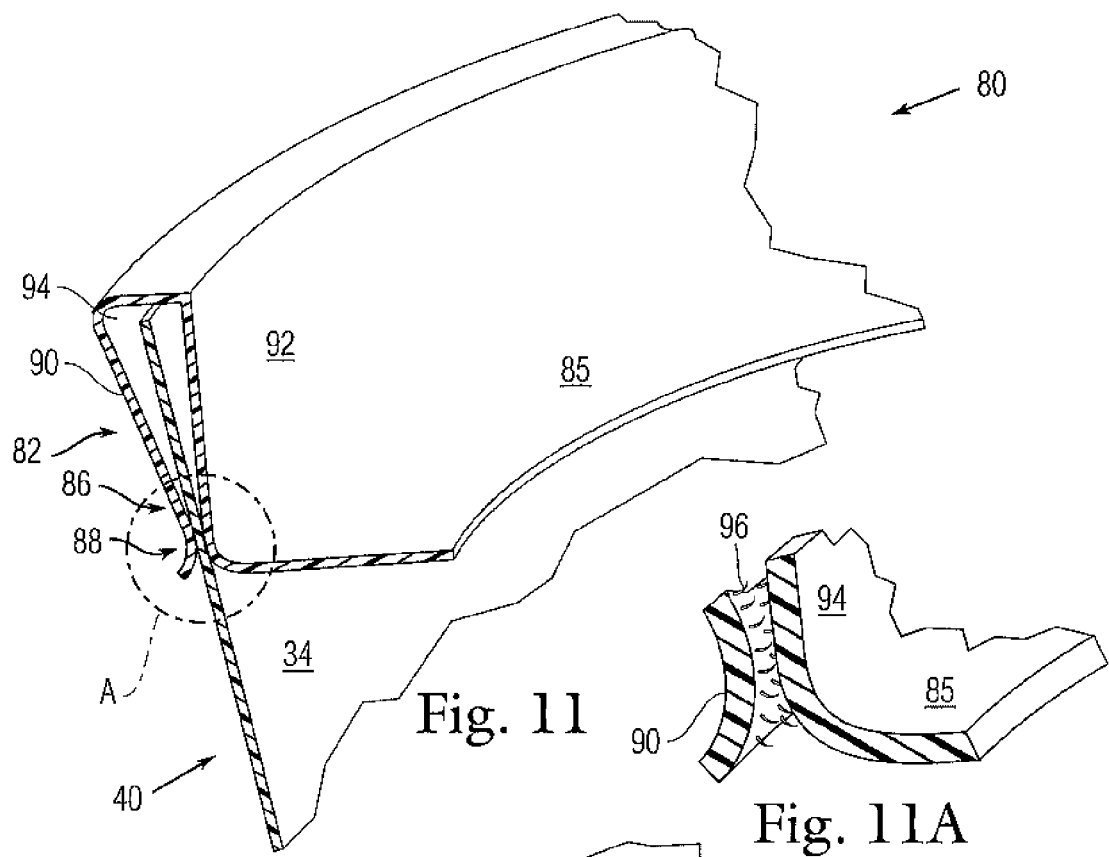
Fig. 11
Fig. 11A
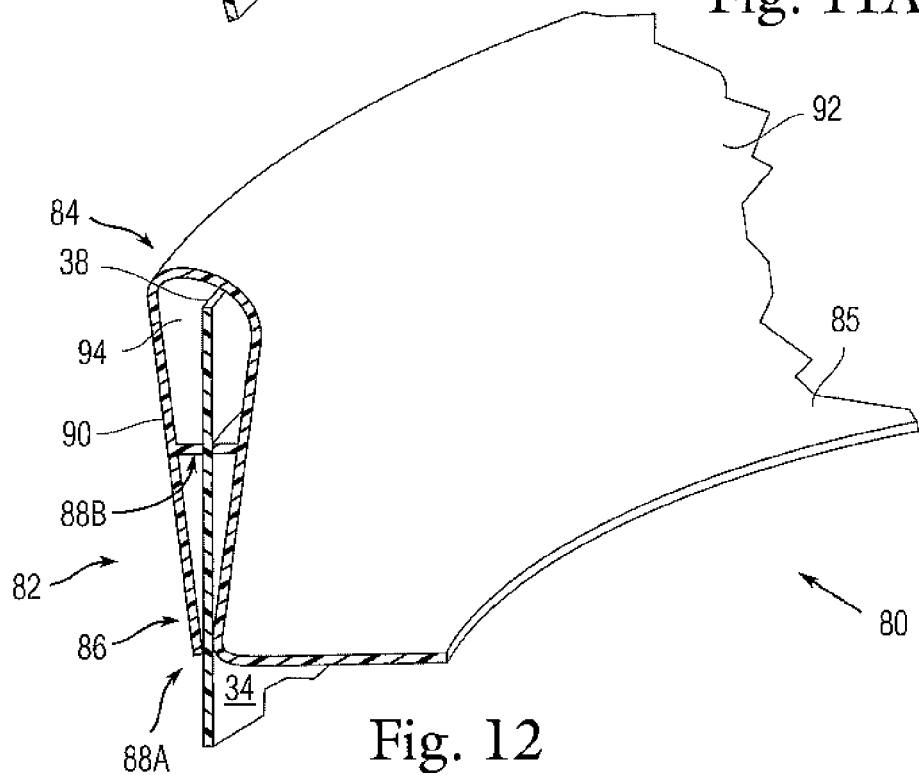
Fig. 12

PET COLLAR

RELATED CASES

This application claims the benefit under 35 U.S.C. §119 (e) of prior U.S. Provisional Patent Application No. 60/946,167 filed Jun. 26, 2007, which is incorporated in its entirety by reference herein.

FIELD OF THE INVENTION

The Present teachings relates to protective devices for animals such as cats or dogs. In particular, the present teachings relates to a barrier that can be positioned in or around a veterinary restraint collars. The barrier provides a shield between the animal's extremities and mouth.

BACKGROUND OF THE INVENTION

Veterinary restraint collars have been known and used for many years. The veterinary restraint collars are frequently used when an animal has a wound or an infected or otherwise sensitive area on its body, or has had surgery in an area that requires protection from biting, chewing, or licking.

Typically, such a protective device is composed of relatively hard plastic or other relatively rigid material that is shaped into a truncated cone, with a center hole at the smaller end for fitting snugly around the animal's neck and with a flaring larger end that extends forwardly alongside the animal's head and substantially surrounds its mouth. These have been referred to as "Elizabethan" collars or e-collar because of their appearance.

The present teachings provide a barrier between the animals' mouth and its extremities without preventing the animal from reaching and eating its food or preventing the animal from climbing up and down a stair case.

SUMMARY OF THE INVENTION

The present teachings provide a protective collar and barrier assembly that includes a collar-forming sheet having inner and outer arcuate edges generally concentric about a common axis. The inner and outer edges extend between a first end and a second end of the collar-forming sheet. Furthermore, the collar-forming sheet is adapted to be bent to form a shape of a truncated cone with a substantial portion of the inner edge adapted to fit around the neck of an animal. The protective collar and barrier assembly further includes a barrier that can be positioned anywhere from about the inner arcuate edge to about the outer arcuate edge of the truncated cone and capable of preventing the animal from reaching its extremities.

The present teachings also describe a kit to add a barrier to a protective collar. The kid includes a barrier designed to be connected to a protective collar having a shape of a truncated cone.

Additionally, present teachings describe a barrier capable of being removably connected to a protective collar having an outer arcuating edge. The barrier includes a fastener and a partition, wherein the fastener is capable of positioning the partition inside the protective collar or about the outer arcuating edge of the protective collar.

Furthermore, the present teachings provide a protective collar and barrier assembly that includes a collar-forming sheet having inner and outer arcuate edges generally concentric about a common axis. The inner and outer edges extend between a first end and a second end of the collar-forming sheet. The collar-forming sheet is adapted to be bent to form a shape of a geometrically-shaped configuration that can be arranged to fit around the neck of an animal. The protective collar and barrier assembly further includes a barrier that can be positioned anywhere from about the inner arcuate edge to about the outer arcuate edge of the truncated cone and capable of preventing the animal from reaching its extremities.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

FIGS. 5-8A are cross-sectional views of alternative protective collar assemblies including a barrier arranged on an outer arcuate edge of a protective collar by a single continuous clip according to various embodiments;

FIGS. 10-13 is a cross-sectional view of alternative protective collar assemblies including a barrier arranged between an outer and inner arcuate edge of a protective collar according to various embodiments;

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to a protective collar assembly for an animal that is capable of preventing the animal from reaching its extremities, such as legs or paws. The protective collar assembly can include a device in a shape of a barrier that can be positioned within a protective collar or on an outer arcuate edge of a protective. As used in the present teaching, the word "truncated cone" and inflections thereof refers to any geometrically-shaped configuration of a protective collar that can be placed around an animal's neck. The word "fit" and inflections thereof, as used in the present teaching, refers to the bending and retaining of a protective collar assembly in a form of a truncated cone around an animal's neck in a manner such that the protective collar assembly provides a desired combination of such properties as comfort and permanence. The word "compliance" and inflections thereof, as used in the present teaching, refers to the ability of an owner or other care-giver to later remove and reapply a protective collar assembly in order to achieve substantially the same fit as that originally obtained.

Figure 1A:
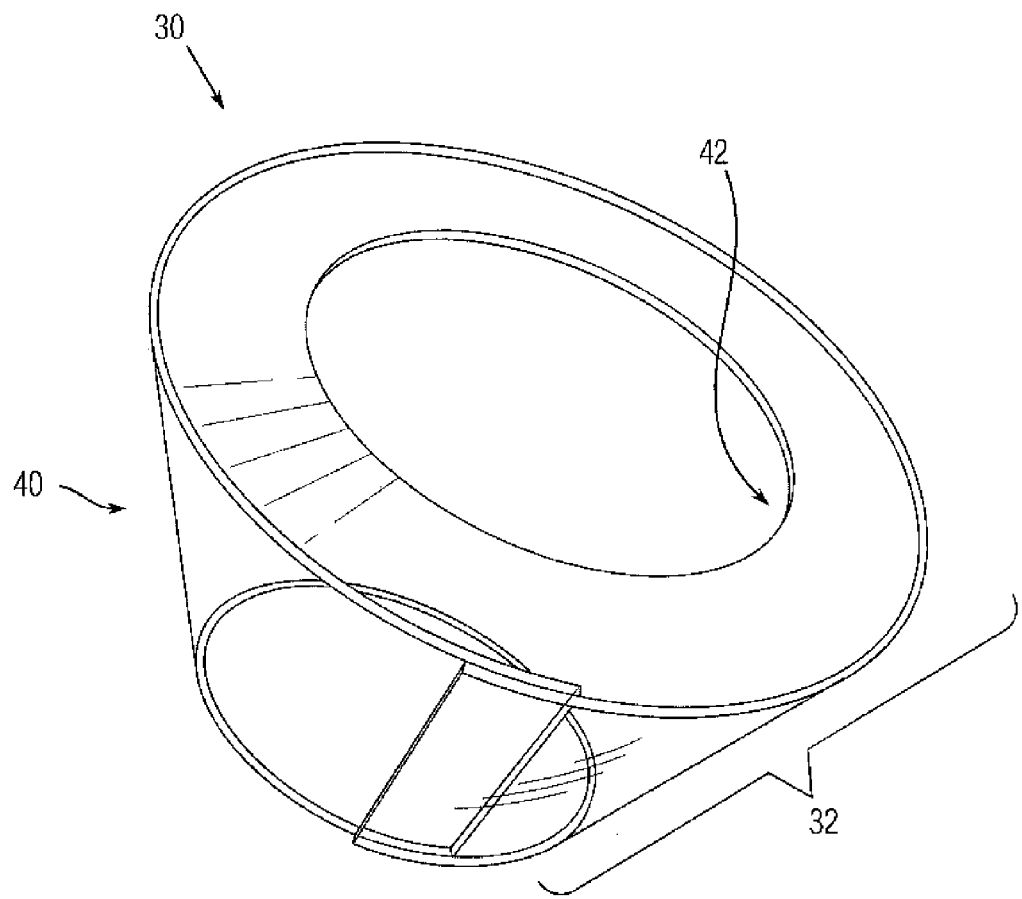
FIG. 1A is a perspective view of the protective collar assembly and barrier according to various embodiments.

As shown in FIG. 1A, a protective collar and barrier assembly 30 of the present teachings can include a protective collar portion 32 and a barrier 42. The protective collar portion 32 can be formed into a truncated cone 40 and the barrier 42 can be arranged on or within the protective collar portion 32 in a manner to prevent an animal from reaching its extremities by its mouth.

Figure 1B:
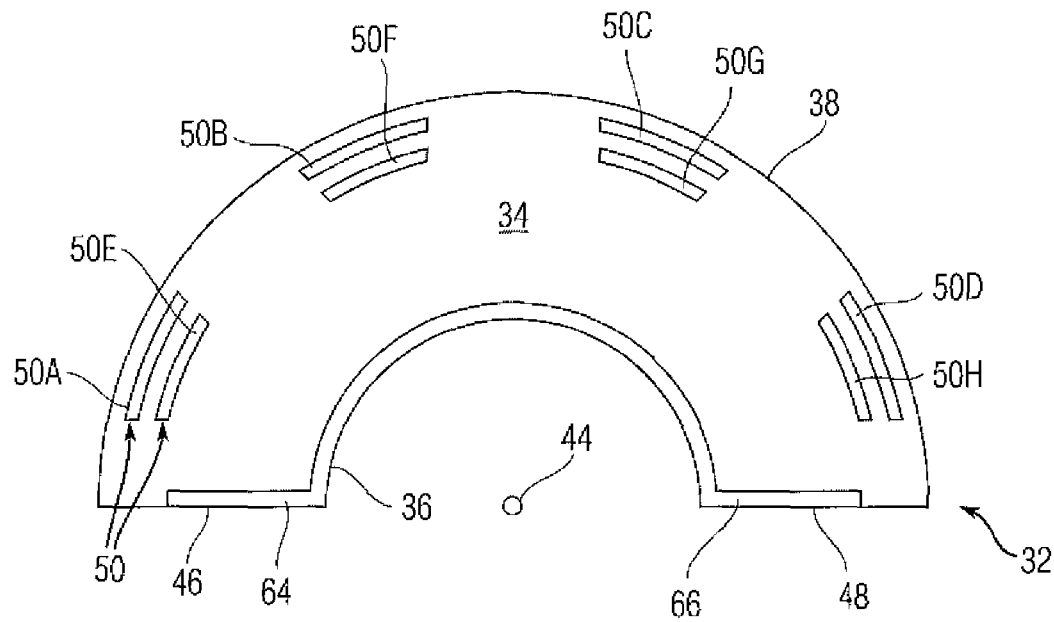
FIG. 1B is a plan view of a protective collar in its flat sheet-like form according to various embodiments.

As shown in FIG. 1B, the protective collar portion 32 can include a substantially flat collar-forming sheet 34 of resiliently flexible material having an inner arcuate edge 36 and an outer arcuate edge 38 generally concentric about common axis 44. The inner and outer arcuate edges 36 and 38 can extend between a first end 46 and a second end 48 of the collar-forming sheet 34. The collar-forming sheet 34 is adapted to be bent in order to form the collar-forming sheet 34 into the shape of the truncated cone 40, as shown in FIG. 1A. A substantial portion of inner arcuate edge 36 defines a smaller diameter of truncated cone 40. This smaller diameter can be adjusted to fit around an animal's neck. Additionally, the collar-forming sheet 34 can include at least one row of openings 50, for example openings 50A-50D, that is arranged to accept at least a barrier 42.

The barrier 42 can be in a shape of a rectangle; however, as would be appreciated by one of ordinary skill in the art, the barrier 42 can have any geometric configuration that would prevent an animal from reaching its extremities by its mouth. For example, the barrier 42 can be in a shape of a circle, semi-circle, oval, trapezoid, triangle, and/or a parallelogram.

Figure 1C:
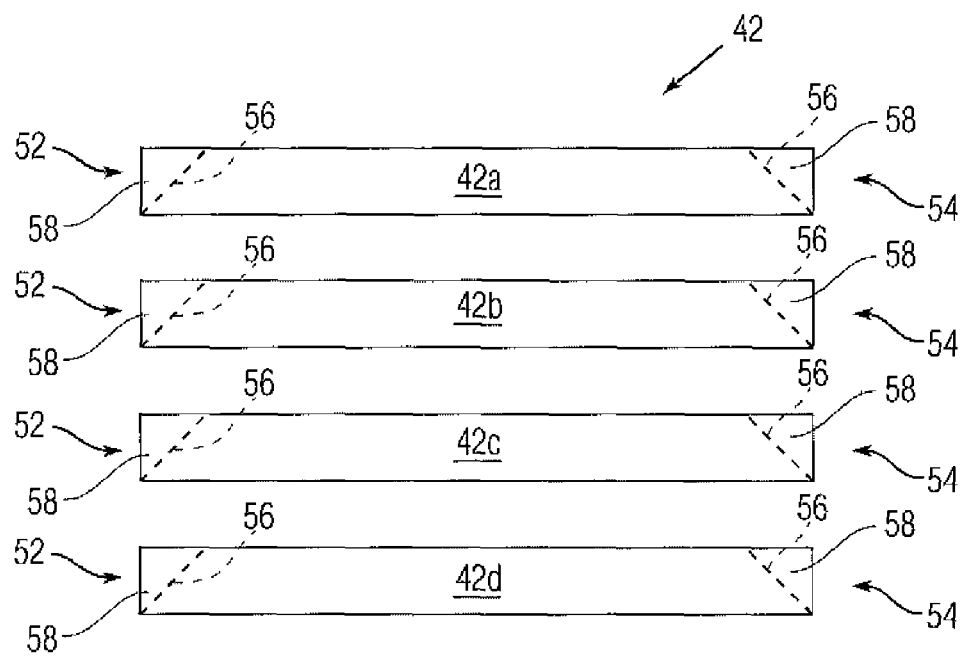
FIG. 1C is a plane view of a set of barriers according to various embodiments.
Figure 1D:
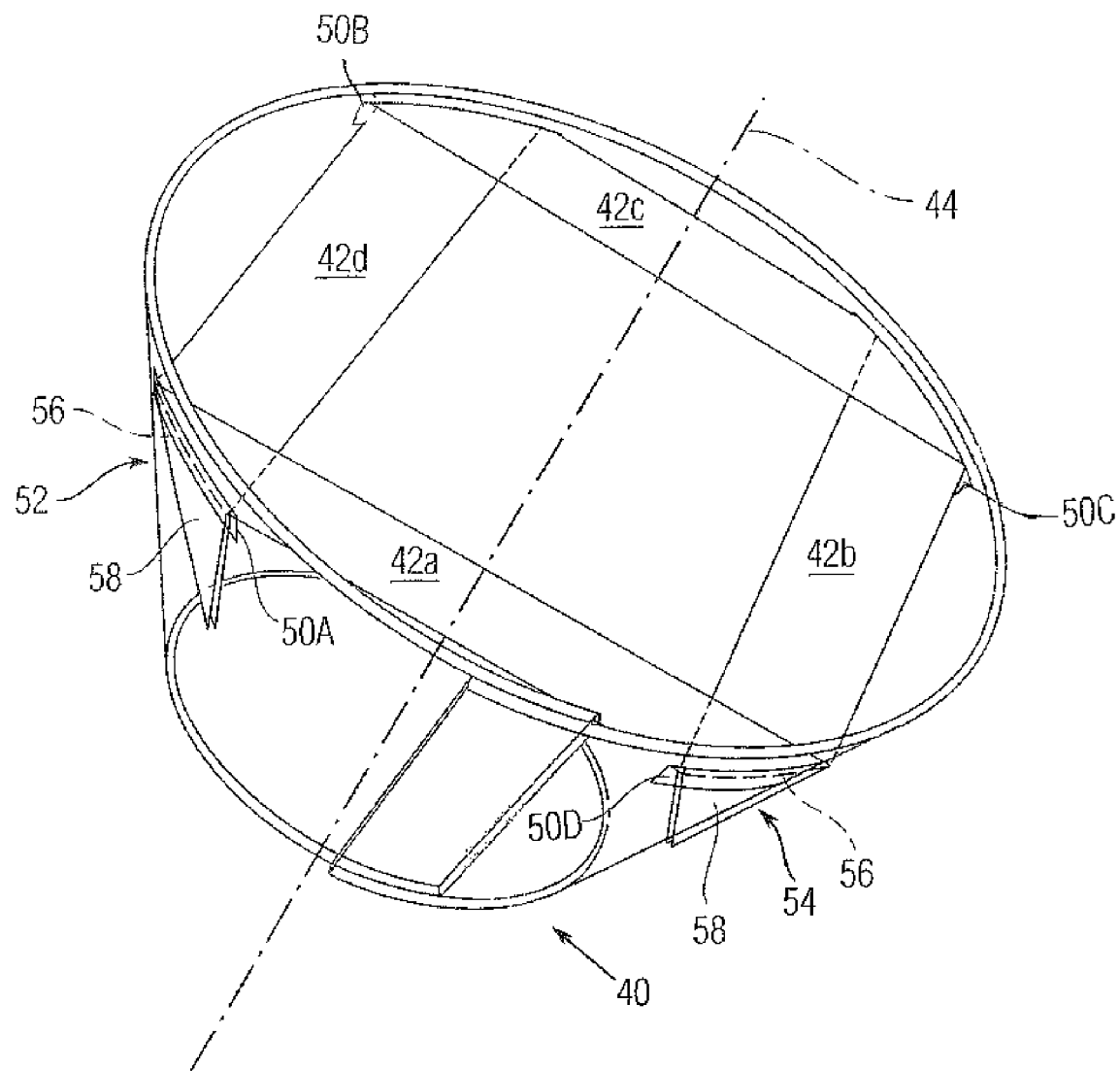
FIG. 1D is a perspective view of a protective collar assembly including the protective collar of FIG. 1B and the barriers of FIG. 1C according to various embodiments.
Figure 1E:
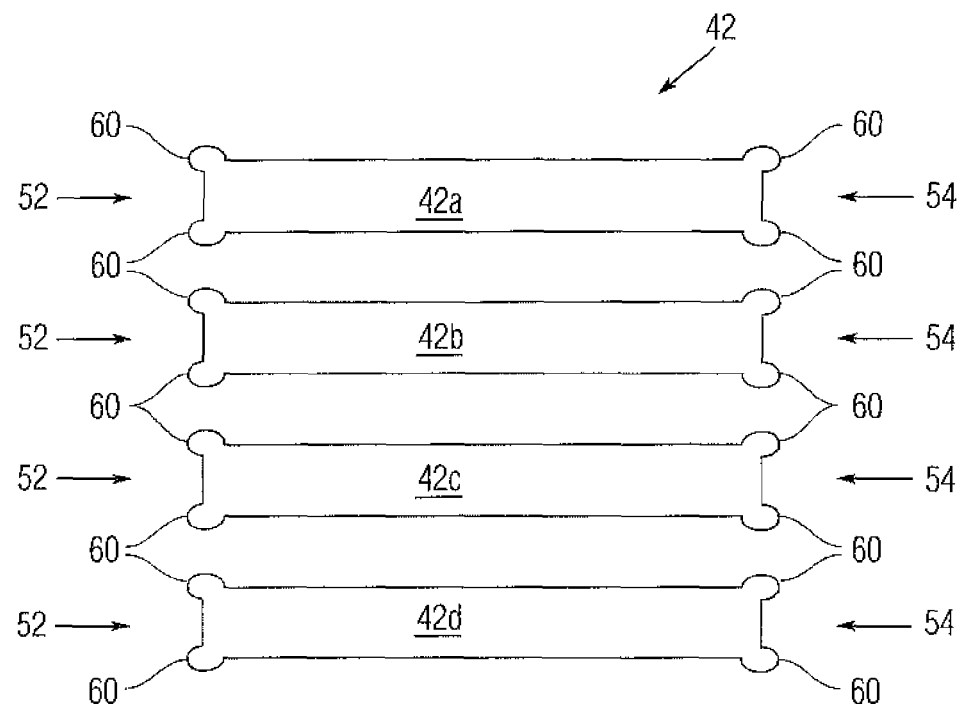
FIG. 1E is a plane view of an alternative set of barriers according to various embodiments.
Figure 1F:
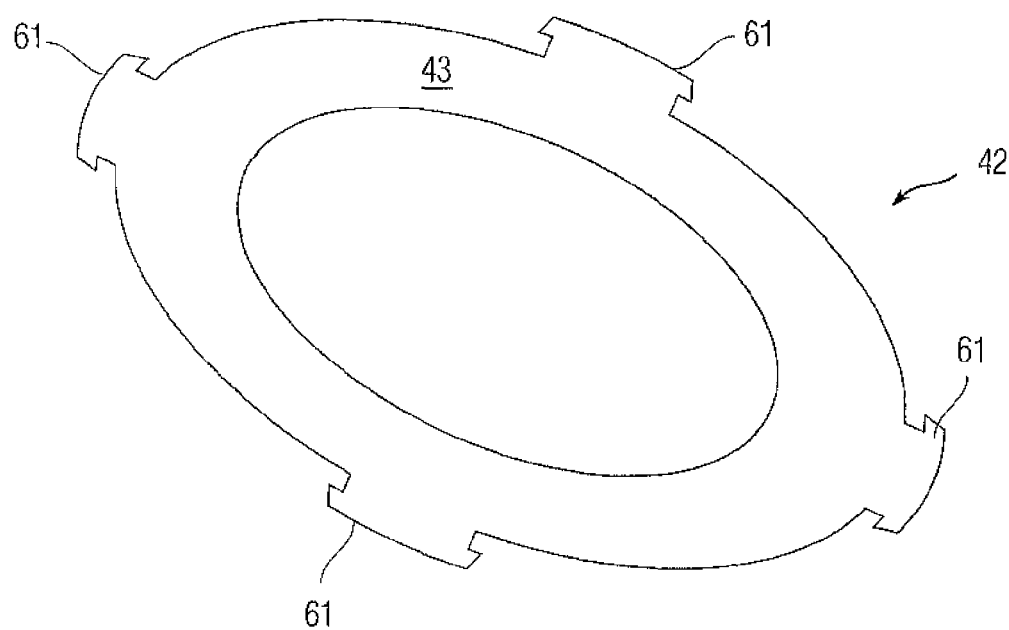
FIG. 1F is a plane view of an alternative barrier according to various embodiments.

Some exemplary shapes of the barrier 42 are shown in FIGS. 1C, 1E, and 1F. In one example, as shown in FIG. 1C, the barrier 42 is a combination of individual partitions 42a-42d. Each of the individual partitions 42a-42d can include a first end portion 52 and a second end portion 54. The first end portion 52 and the second end portion 54 can also include a perforated line 56 to create foldable portions 58. The foldable portions 58 can bend to thereby secure the each of the individual partitions 42a-42d to the truncated cone 40. Preferably, the foldable portions 58 can include an adhesive composition or a fastening device. As shown in FIG. 1D, to position and secure the barrier 42 to the truncated cone 40, the first end portion 52 of each of the individual partitions can be inserted into one of the openings 50 and the second end 54 can be inserted into another one of the opening 50, such that each of foldable portions 58 extend out of the openings 50. The foldable portions 58 can then be folded or bent at the perforated line 56 to secure each of the individual partitions 42a-42d in its location.

In another example as shown in FIG. 1E, the first end portion 52 and the second end portion 54 can include protrusions 60 that are adapted to secure the each of the individual partitions 42a-42d of the barrier 42 to the truncated cone 40. For example, the protrusions 60 can be made of a flexible material that can be manipulated to permit insertion of the first and second end portions 52 and 54 of each of the individual partitions 42a-42d into one or more of the openings 50A-50H (as shown in FIG. 1B). Once each of the individual partitions 42a-42d is in a desired positioned, the protrusions 60 can spring back to their original configuration, thereby securing them in their desired location.

In another example as shown in FIG. 1F, the barrier 42 can include a circular partition 43. The circular partition 43 can include a plurality of anchors 61 positioned on the outer circumference of the circular partition 43. Each of the plurality of anchors 61 can be inserted into one of corresponding opening 50A-50H (as shown in FIG. 1B) to at least removably secure the circular partition 43 to the truncated cone 40.

Figure 2:
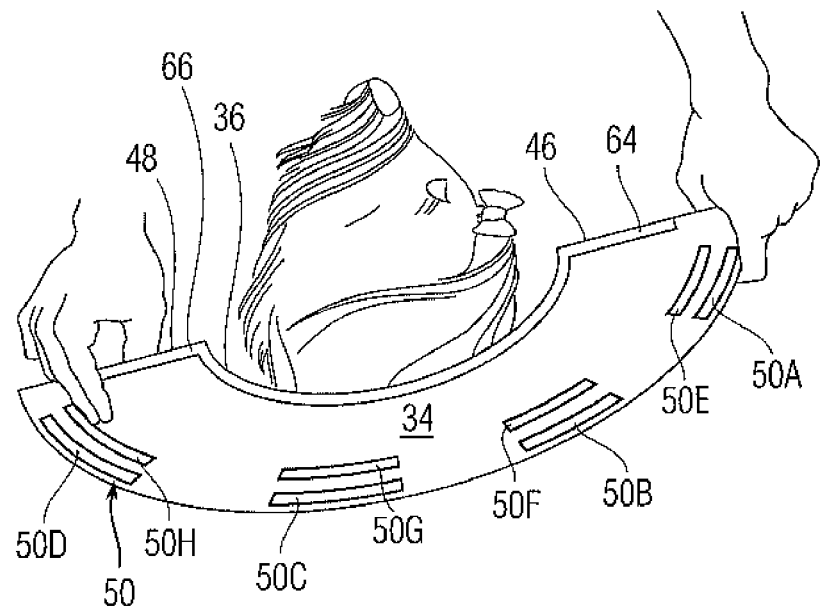
FIG. 2 is a perspective view of an animal with the protective collar of FIG. 1B being fitted around a neck of the animal according to various embodiments.
Figure 3:
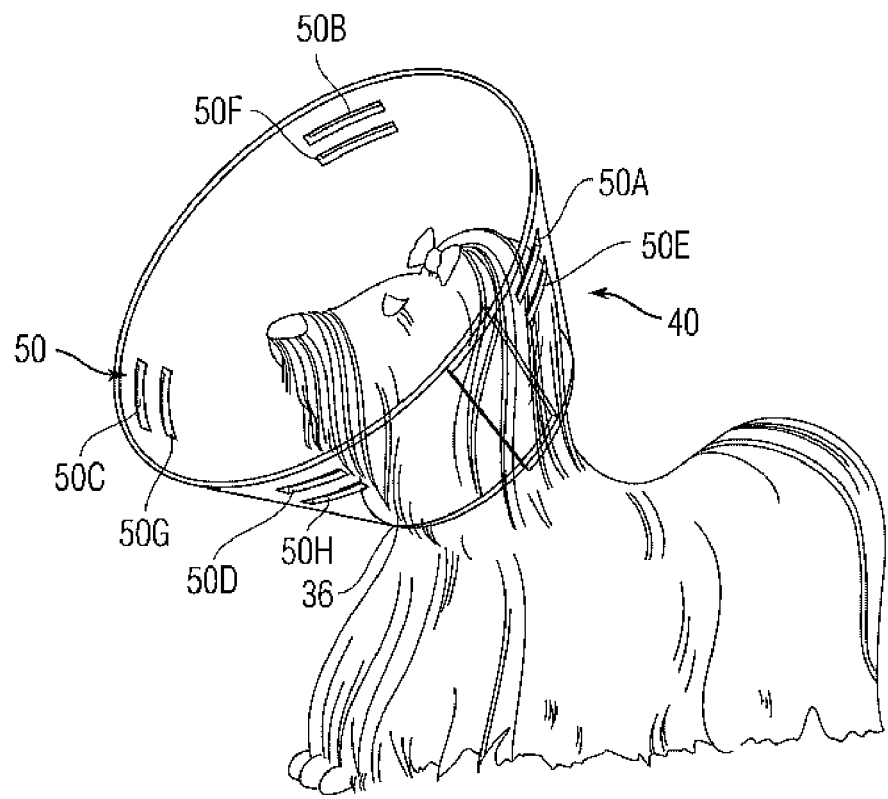
FIG. 3 is a perspective view of the animal having the protective collar of FIG. 1B secured around its neck according to various embodiments.
Figure 4:
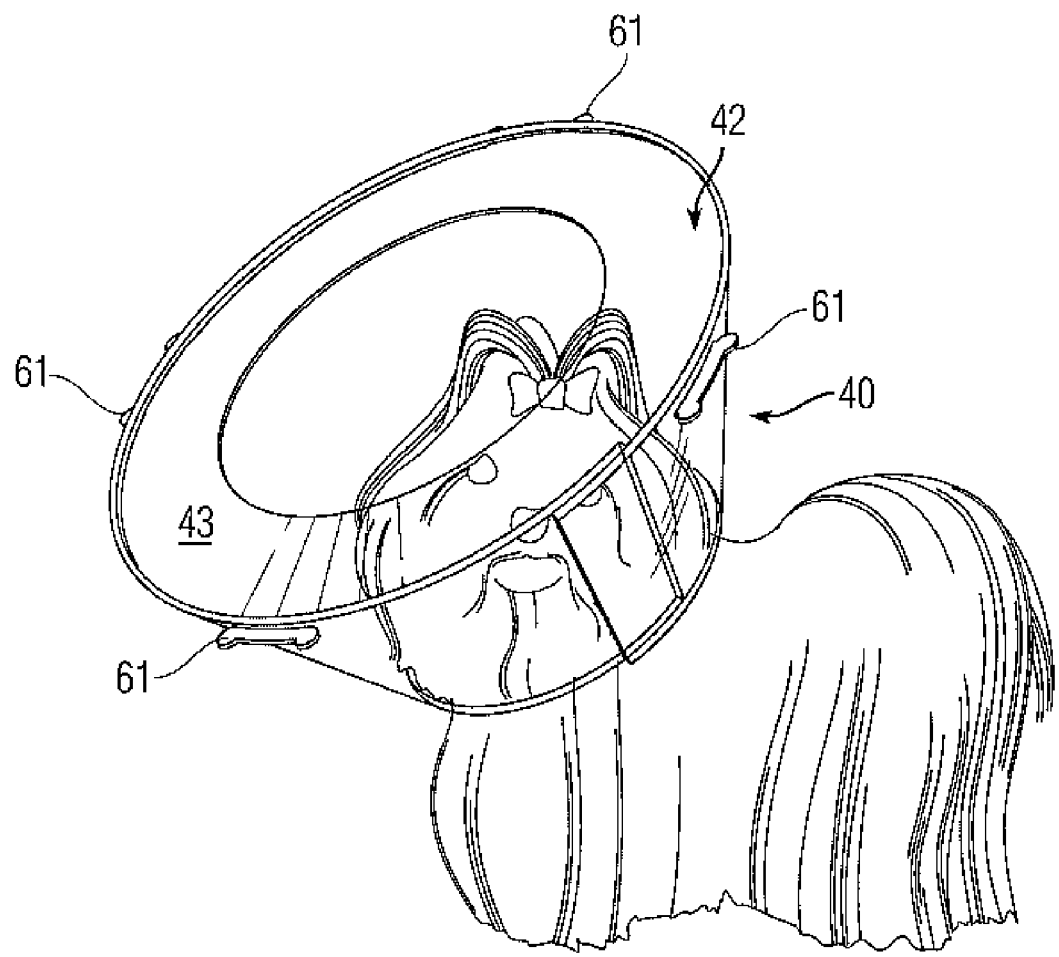
FIG. 4 is a perspective view of the animal and the protective collar of FIG. 3 with the barrier of FIG. 1F according to various embodiments.

Referring to FIGS. 2-4, the protective collar assembly 30 is shown before and after being bent to form the truncated cone 40 around an animal's neck. As shown in FIGS. 2 and 3, the collar-forming sheet 34 can be positioned such that an inner arcuate edge 36 is around the animal's neck. The collar-forming sheet 34 can then be bent such that portions of the inner arcuate edge 36 can overlap to define a diameter adapted to fit the animal's neck. Additionally, the inner arcuate edge 36 can overlap at least far enough to provide a sufficient overlapping width for closure members 64 and 66 to provide an optimal combination of such properties as strength of engagement, releasability, durability, flexibility, and conformability. Suitable closure members include but are not limited to the separable "hook" and "loop"-type fastening devices as described, for instance, in U.S. Pat. Nos. 2,717,437 and 3,009,235, the disclosures of which are hereby incorporated by reference. Other examples of closure members 64 and 66 can include clip type fastening devices as described, for instance, in U.S. Pat. Nos. 5,349,927 and 3,036,554, the disclosures of which are hereby incorporated by reference.

An example of hook and loop type closure member is a pair of the SCOTCHMATE™ closure system available from 3M Company, St. Paul, Minn. (having mateable "loop" strip and "hook" strips).

The closure members 64 and 66 can be provided in a size suitable to substantially traverse the entire width of the collar-forming sheet 34, i.e., from the inner arcuate edge 36 (less the width taken up by any padding that may be used) to the outer arcuate edge 38. The closure members 64 and 66 that traverse the width in this manner lessen the possibility that an animal can insert a paw or other body part into a gap between overlapping portions in order to force open the collar assembly.

The closure members 64 and 66 can be attached to the collar-forming sheet 34 at the time of manufacture or can be sold separately so that a user can connect the closure members 64 and 66 to the sheet 34 at the time the protective collar is being fitted around the animal's neck.

Once the inner arcuate edge 36 is placed around an animal's neck and the closure member 64 is connected to the closure member 66 to form the truncated cone 40, each of the anchors 61 of the circular barrier 42 shown in FIG. 1F can be inserted into a corresponding opening 50 to secure the circular partition 43 to the truncated cone 40, as shown in FIG. 4. If the barrier is similar in shape to the barrier shown in FIG. 1E, then the first end 52 having the protrusions 60 can be inserted into one of the openings 50 and the second end 54 having the protrusions 60 can be inserted into another one of the openings 50 to removably secure each of the individual partitions 42a-42d to the truncated cone 40.

FIGS. 5-13 show clippable barriers 80 that can be clipped on a truncated cone 40. Each of the clippable barriers 80 shown in FIGS. 5-13 includes a clip-like fastener 82 and a partition 85. The clippable barrier 80 can be arranged such that (i) the partition 85 is positioned proximate to the outer arcuate edge 38 of the truncated cone 40, as shown in FIGS. 5-9 or (ii) the partition 85 is positioned between the outer arcuate edge 38 and the inner arcuate edge 36 of the truncated cone 40, as shown in FIGS. 10-13.

Figure 5:
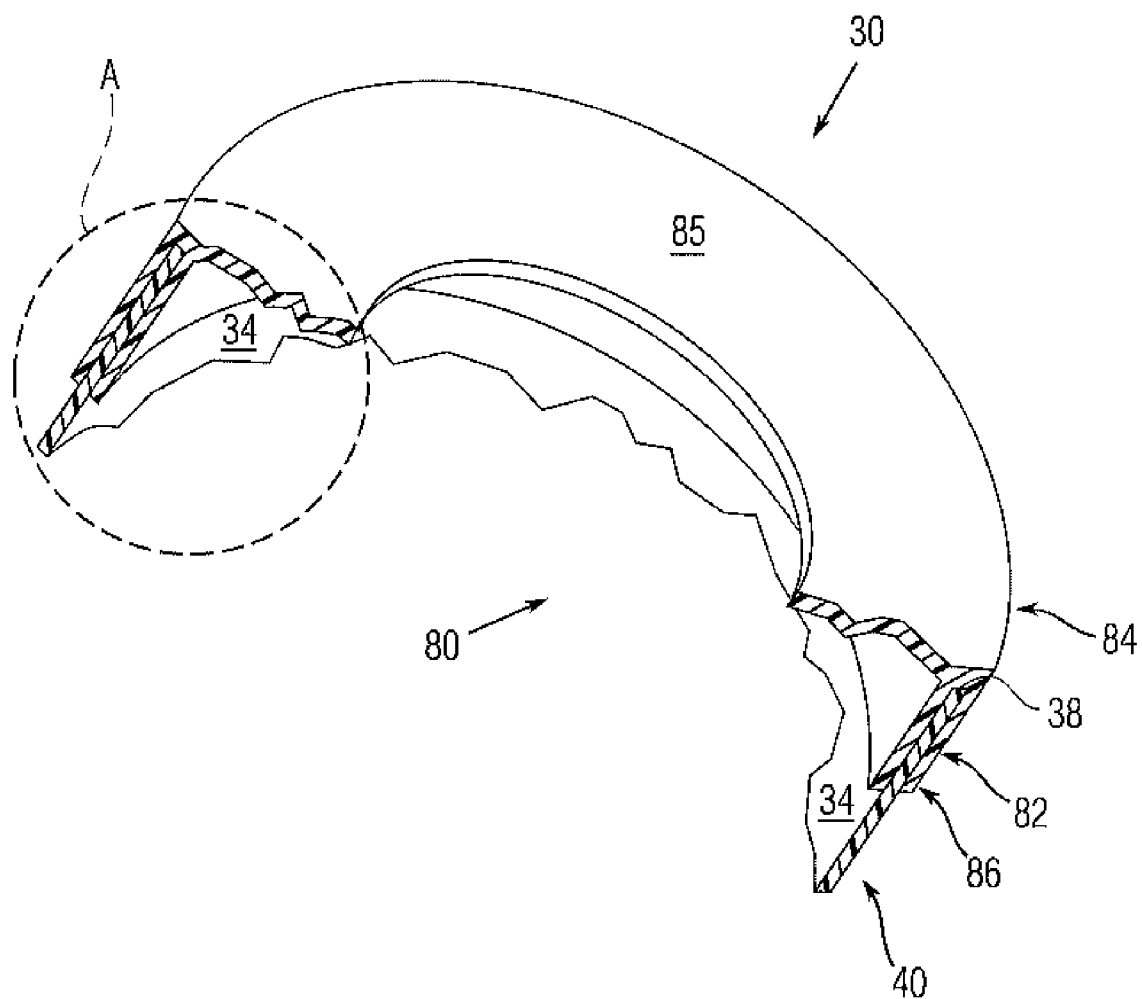
Figure 5A:
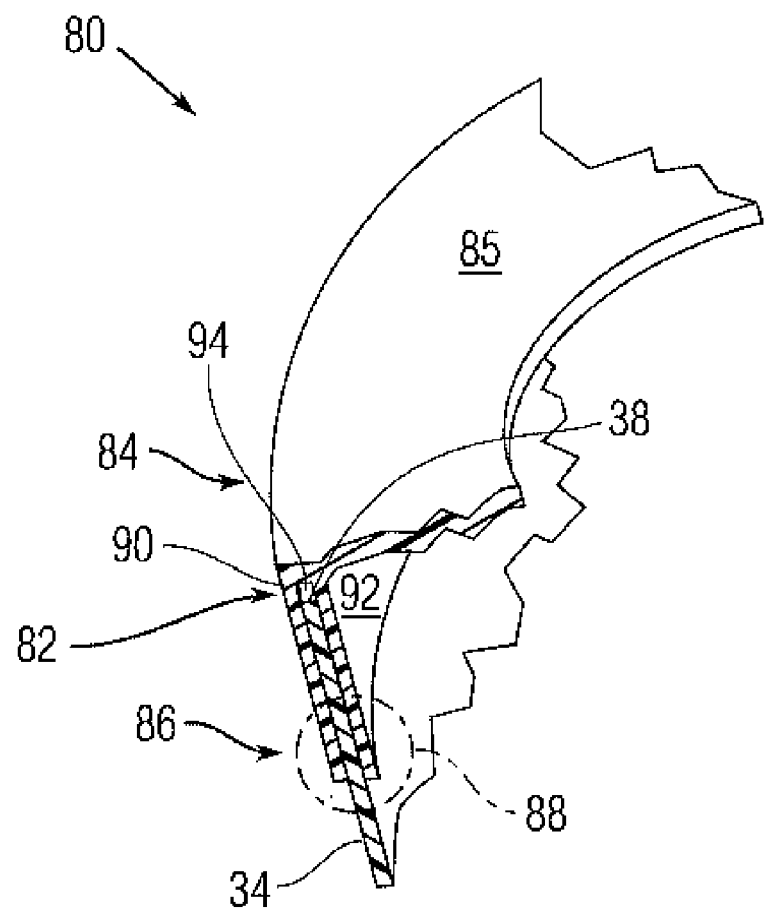

As shown in FIG. 5, the clippable barrier 80 can be bent to substantially form a circular shape having a diameter that is substantially similar to the diameter of the outer arcuate edge 38 of the truncated cone 40. The clip-like fastener 82 of the clippable barrier 80 then secures the partition 85 at a desired location (e.g., proximate to the outer arcuate edge 38 of the truncated cone 40). The clippable barrier 80 can be made of a sheet material that can be formed into a circle to fit on any existing restraint collar. If the clippable barrier 80 provides a larger circle than the outer arcuate edge 38 of the truncated cone 40, the clippable barrier 80 can be further bent to provide a smaller circle. Any extra portion created by further bending of the clippable barrier 80 can be cut and disposed of. As shown in FIG. 5A, the clip-like fastener 82 includes a top portion 84, a bottom portion 86, an exterior wall 90, and an interior wall 92. The arrangement of the top portion 84, the bottom portion 86, the exterior wall 90, and the interior wall 92 create a pinching portion 88 and a pocket 94. In a first example, the partition 85 can be connected to or can be a part of or an extension of the top portion 84 of the clip-like fastener 82. To use the clippable barrier 80 on any existing restraint collar, the outer arcuate edge 38 of the truncated cone 40 can be positioned in the pocket 94, such that the pinching portion 88 of the clippable barrier 80 can secure the partition 85 on the truncated cone 40, as shown in FIGS. 5-13.

Some alternative exemplary clippable barriers 80 that can be arranged such that the partition 85 is positioned proximate to the outer arcuate edge 38 of the truncated cone 40 are shown in FIGS. 6-9. As shown in FIG. 6, the clip-like fastener 82 includes a pinching portion 88 and a partition 85 that is an extension of the top portion 84 of the clip-like fastener 82. The clip-like fastener 82 includes an exterior wall 90 and an interior wall 92 that are arranged to provide the pinching portion 88 at the bottom portion 86 of the clip-like fastener 82. As shown in FIG. 6A, the pinching portion 88 can include hook-like devices 96 that further prevent the clippable barrier 80 from sliding off from the collar-forming sheet 34 that is shaped into a truncated cone 40.

As shown in FIG. 7, the clip-like fastener 82 can include a first pinching portion 88A and a second pinching portion 88B to further secure the clippable barrier 80 to the collar-forming sheet 34. As shown in FIG. 7, the first pinching portion 88A can be positioned at the bottom portion 86 of the clip-like fastener 82 and the second pinching portion 88B can be positioned between the top portion 84 and the bottom portion 86 of the clip-like fastener 82. Both pinching portions 88A and 88B can include hook-like devices that further prevent the clippable barrier 80 from sliding off from the collar-forming sheet 34 that is shaped into a truncated cone 40.

As shown in FIGS. 8 and 8A, the clip-like fastener 82 includes a pinching portion 88 and a partition 85. The partition 85 can be an extension of the top portion 84 of the clip-like fastener 82. The clip-like fastener 82 includes an exterior wall 90, a pressing wall 98, and an interior wall 92. The exterior wall 90 and the pressing wall 98 can form a shape that is similar to the letter "U." Furthermore, the arrangement of the exterior wall 90, the pressing wall 98, and the interior wall 92 provide the pinching portion 88. As shown in FIGS. 8 and 8A, the pressing wall 98 can include spring-like characteristics that is arranged to come in direct contact with a collar-forming sheet 34. The portion of the pressing wall 98 coming in contact with the collar-forming sheet 34 can include a surface area that is capable of securing the clippable barrier 80 to the collar-forming sheet 34 by friction or any means known to one skilled in the art.

Figure 9A:
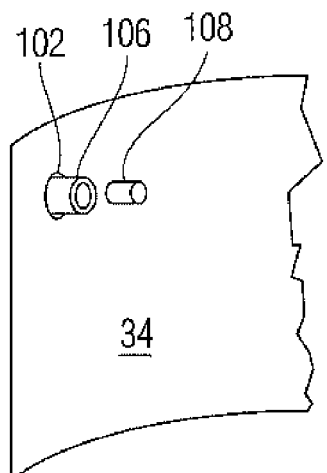
FIG. 9A shows a portion of the protective collar of FIG. 9 that is capable of accepting the single non-continuous clip of the barrier shown in FIG. 9.
Figure 9:
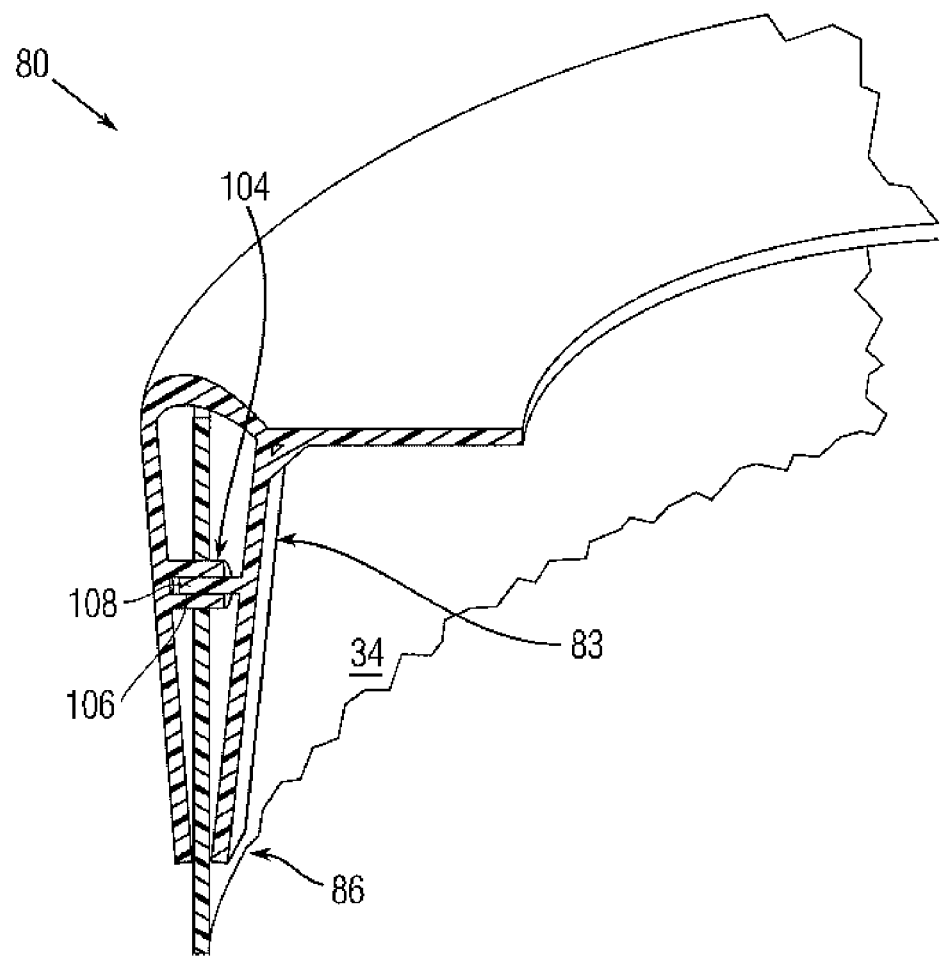
FIG. 9 is a cross-sectional view of an alternative protective collar assembly including a barrier secured on an outer arcuate edge of a protective collar by a single non-continuous clip according to various embodiments.

Referring to FIGS. 9 and 9A, an alternative clippable barrier 80 is shown. This alternative clippable barrier 80 have an arrangement that includes a partition 85 connected to or being part of at least one discrete clip-like fastener 83. The Discrete clip-like fastener 83 can include a locking mechanism 104. Any type of locking mechanism 104 can be used in the present teachings. For example, as shown in FIGS. 9 and 9A, a snap-locking mechanism can be used. The snap-locking mechanism can include a female section 106 and a male section 108.

To secure the clippable barrier 80 to a collar forming sheet 34, the clippable barrier 80 can be positioned such that the female section 106 and the male section 108 of the locking mechanism 104 are positioned on opposite sides of an opening 102 in the collar forming sheet 34. Preferably, the at least the female section 106 or the male section 108 includes a diameter sufficiently large enough friction fit through the opening 102. The male section 108 can then snap into the female section 106 to secure the clipping barrier 80 to the collar forming sheet 34.

Figure 10:
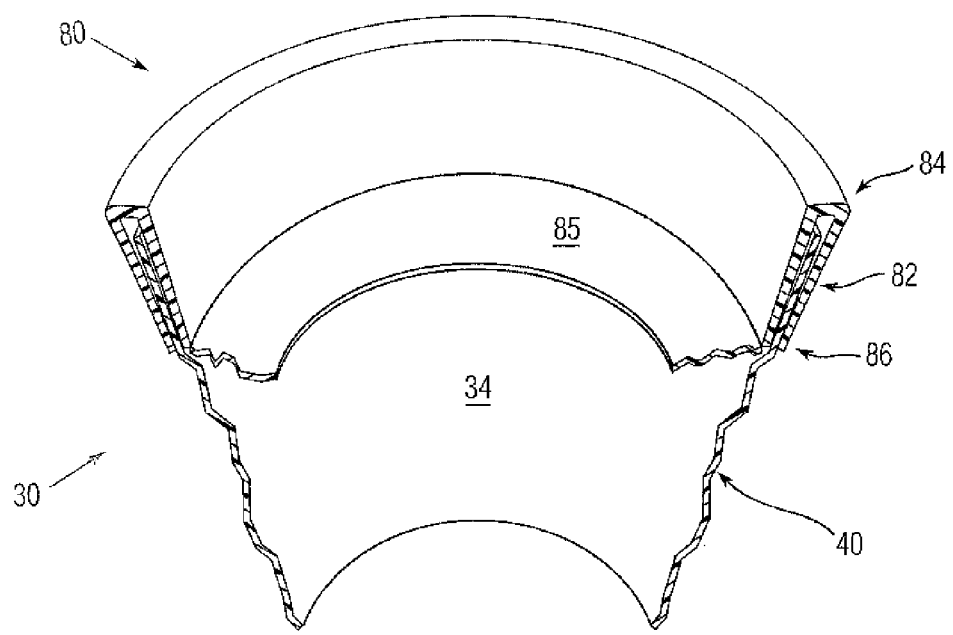
Figure 10A:
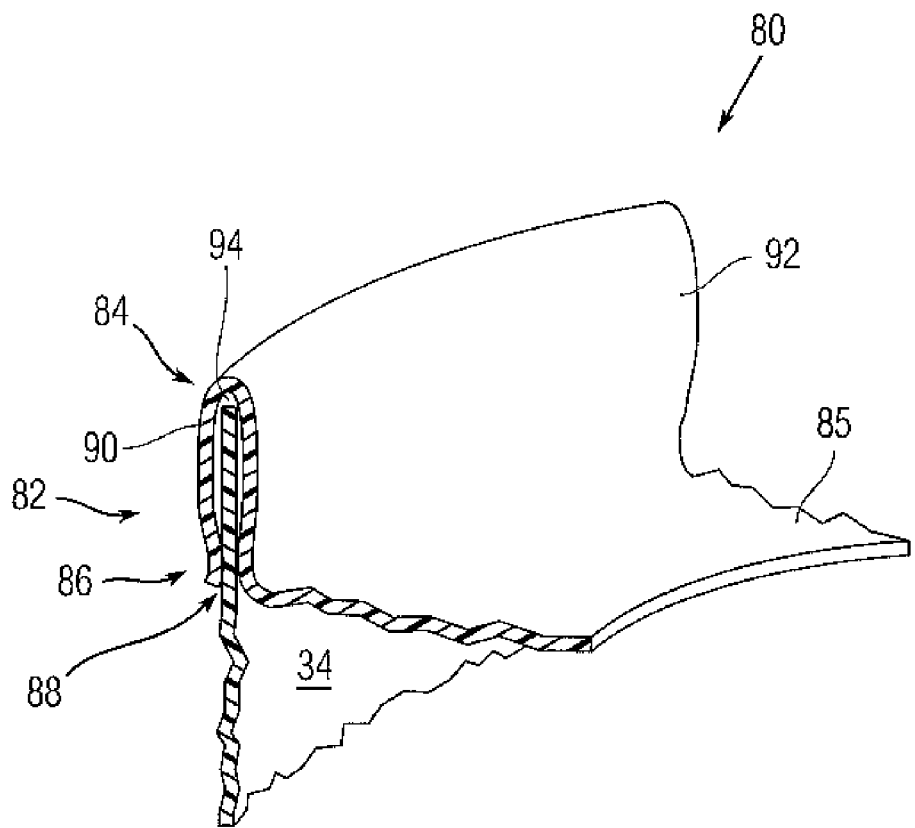

Referring to FIGS. 10 and 10A, an alternative a protective collar and barrier assembly 30 including a clippable barrier 80 having a partition 85 and a collar forming sheet 34 capable of being formed into a truncated cone 40 is shown. In this alternative embodiment, the clippable barrier 80 includes a design such that when it is placed over an outer arcuate edge 38 of the truncated cone 40, the partition 85 is positioned between the outer arcuate edge 38 and an inner arcuate edge 36. The clippable barrier 80 can be made of a sheet material that can be formed into a circle to fit on any existing restraint collar. If the clippable barrier 80 provides a larger circle than the outer arcuate edge 38 of the truncated cone 40, the clippable barrier 80 can be bent to provide a smaller circle. Any extra portion of the clippable barrier 80 formed from further bending can be cut and disposed of. As shown in FIG. 10A, a clip-like fastener 82 includes a top portion 84, a bottom portion 86, an exterior wall 90, and an interior wall 92. The arrangement of the top portion 84, the exterior wall 90, and the interior wall 92 creates a pinching portion 88 and a pocket 94. In a first example, the partition 85 is connected to or is part of the bottom portion 86 of the clip-like fastener 82. To use the clippable barrier 80 on any existing restraint collar, the outer arcuate edge 38 of the truncated cone 40 can be positioned in the pocket 94, such that the pinching portion 88 can secure the clippable barrier 80 on the truncated cone 40.

Figure 13:
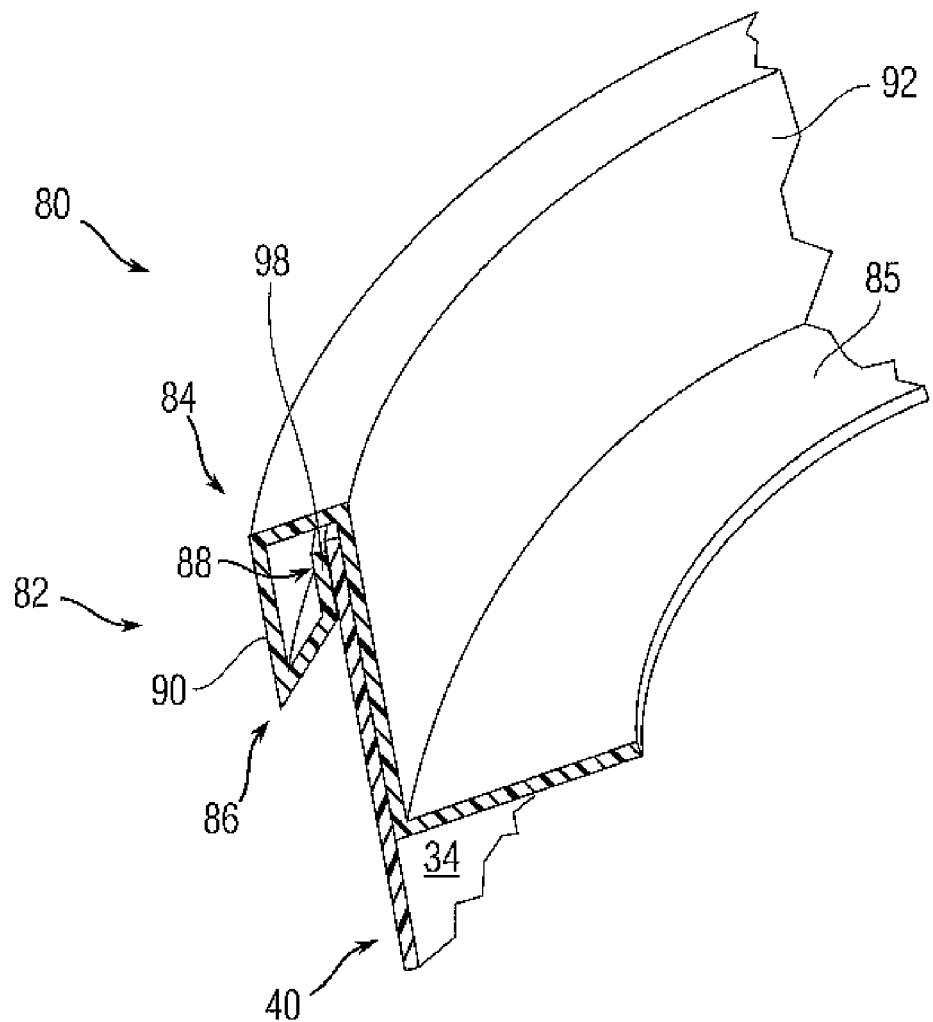

Referring to FIGS. 11-13, several alternative clippable barriers 80, which when positioned over an outer arcuate edge 38 of a truncated cone 40, place a partition 85 between the outer arcuate edge 38 and an inner arcuate edge 36 are shown. As shown in FIG. 11, the partition 85 is an extension of the bottom portion 86 of the clip-like fastener 82. The clip-like fastener 82 includes the exterior wall 90 and the interior wall 92 that provide the pinching portion 88. As shown in FIG. 11A, the pinching portion 88 can include hook-like devices 96 that are capable of preventing the clippable barrier 80 from sliding off from the truncated cone 40 after installation.

Referring to FIG. 12, an alternative clippable barrier 80 is shown. The clippable barrier 80 can include a partition 85 and a clip-like fastener 82. The clip-like fastener 82 can include a top portion 84, a bottom portion 86, an exterior wall 90, and an interior wall 92. The exterior wall 90 and the interior wall 92 provide a pocket 94 and a first pinching portion 88A. As shown in FIG. 12, the first pinching portion 88A can be positioned at the bottom portion 86 of the clip-like fastener 82. An outer arcuate edge 38 of a truncated cone 40 can be positioned in the pocket 94, such that the clippable barrier 80 is secured to the truncated cone 40 by the first pinching portion 88A. Optionally, the clip-like fastener 82 can include a second pinching portion 88B to further secure the clippable barrier 80 to the truncated cone 40. When the optional second pinching portion 88B is made available, preferably, it is positioned between the top portion 84 and the bottom portion 86 of the clip-like fastener 82. The clip-like fastener 82 can also include hook-like devices 96 (see FIG. 11A) that are capable of preventing the clippable barrier 80 from sliding off from the truncated cone 40 after installation.

Referring to 13, another alternative clippable barrier 80 is shown. The clippable barrier 80 of FIG. 13 can include a partition 85 and a clip-like fastener 82. The clip-like fastener 82 can include a top portion 84, a bottom portion 86, an exterior wall 90, and an interior wall 92. The clip-like fastener 82 also includes a pinching portion 88, which is portioned between the top portion 84 and the bottom portion 86. The pinching portion 88 can include a pressing device 98. The pressing device 98 can be a portion of the clip-like fastener 82 having spring-like characteristics that is arranged to come in direct contact with a truncated cone 40. The portion of the pressing device 98 coming in contact with the truncated cone 40 can include a surface area that is capable of securing the clippable barrier 80 to the truncated cone 40 by friction or any means known to one skilled in the art.

Each of FIGS. 10-13 shows a clippable barrier 80 that includes a clip-like fastener 82 having an interior wall and an exterior wall. The interior wall and the exterior wall are continues through the entire length of a clippable barrier 80. However, one of ordinary skill in the art would appreciate that a clippable barrier 80 can have an arrangement that includes a partition 85 connected to or being part of at least one discrete clip-like fastener as described above with respect to FIGS. 9 and 9A.

Referring to FIGS. 14-17, several alternative embodiments of the present invention are shown. These alternative embodiments show a connectable barrier assembly 100 that is capable of being secured to a truncated cone 40 by a securing device or composition, such as an adhesive material/tape, magnets, and/or hooks and loops.

Figure 14:
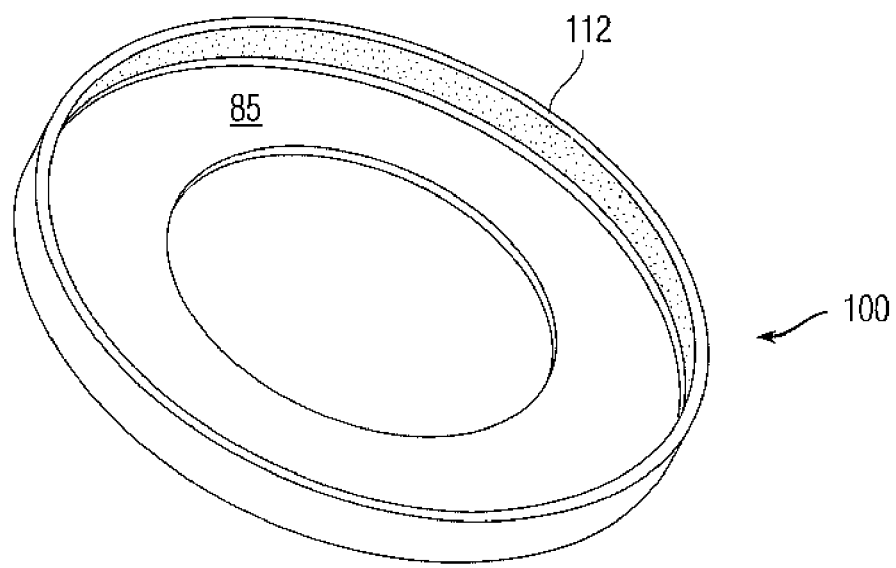
FIG. 14 is a perspective view of an alternative barrier according to various embodiments.
Figure 15:
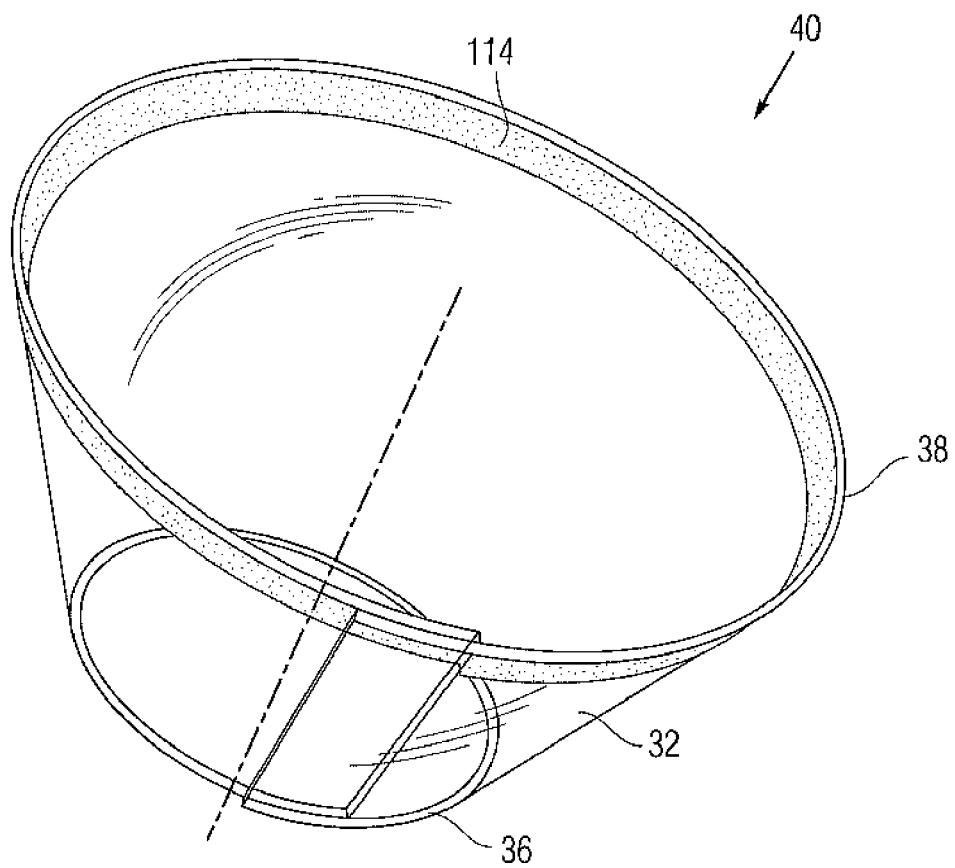
FIG. 15 is a perspective view of a protective collar capable of receiving the barrier of FIG. 14 according to various embodiments.
Figure 16:
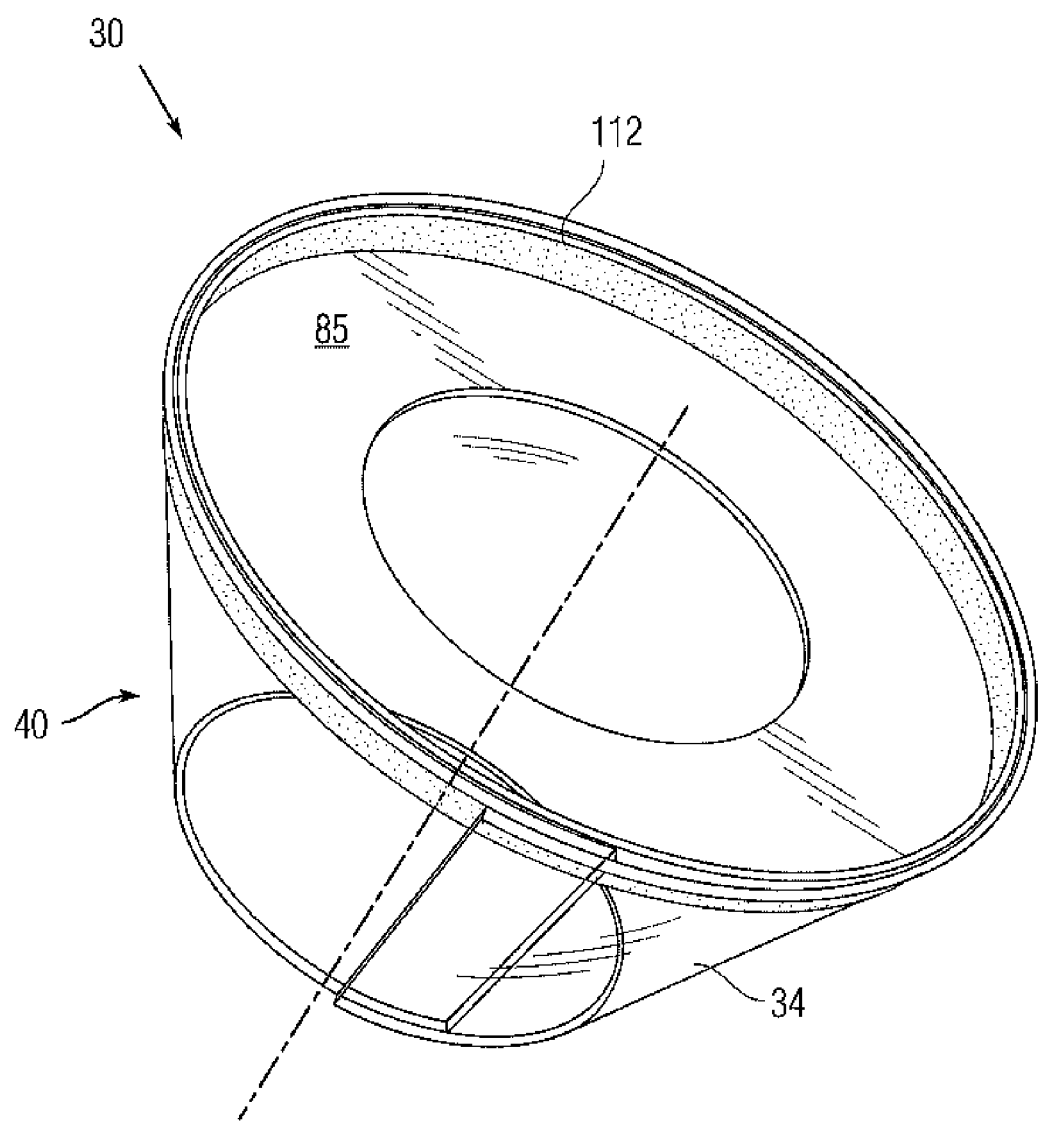
FIG. 16 is a is a perspective view of a protective collar assembly including the barrier of FIG. 14 and the protective collar of FIG. 15 according to various embodiments.

Referring to FIGS. 14-16, a connectable barrier 100 having a partition 85 and a first connector 112 is shown. The first connector 112 can be an adhesive material/tape, hooks or loops of a hook and loop connector, and/or a magnetic material to name a few. Using the first connector 112, the connectable barrier 100 can be secured to the truncated cone 40 having a second connector 114. The second connector 114 can be any connecting means capable of receiving or fastening to the first connector 112 of the connecting barrier 100 to form a protective collar and barrier assembly 30 shown in FIG. 16. For example, the second connector 114 can include an adhesive material, hooks or loops of a hook and loop connector, and/or a magnetic material to name a few.

Figure 17:
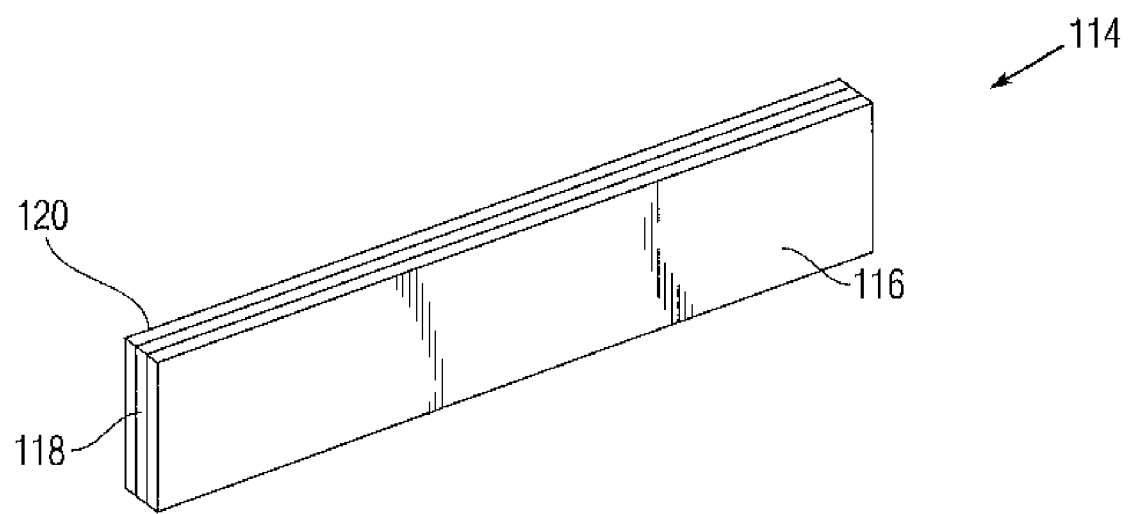
FIG. 17 is a perspective view of a connector in a kit for converting a protective collar to a protective collar assembly according to various embodiments.

The connectable barrier 100 can be part of a kit that includes a first connector 112 and a second connector 114. This kit allows conversion of any presently existing truncated protective collar to the protective collar and barrier assembly of the present invention. As shown in FIG. 17, the second connector 114 of the kit can include a front side 116 and a backside 118. The front side 116 can be the adhesive material, hooks or loops of hooks and loops connector, and/or magnetic material. The backside 118 of the second connector 114 can include an adhesive material 120 that allows a user to attaching the second connector 114 to any existing truncated protective collar.

Referring to FIGS. 18-21, two alternative protective collar and barrier assemblies 30 are shown. The protective collar and barrier assembly 30 can include a design such that when closure members 64 and 66 are overlapped, a truncated cone and a barrier are formed as a unitary unit.

Figure 18:
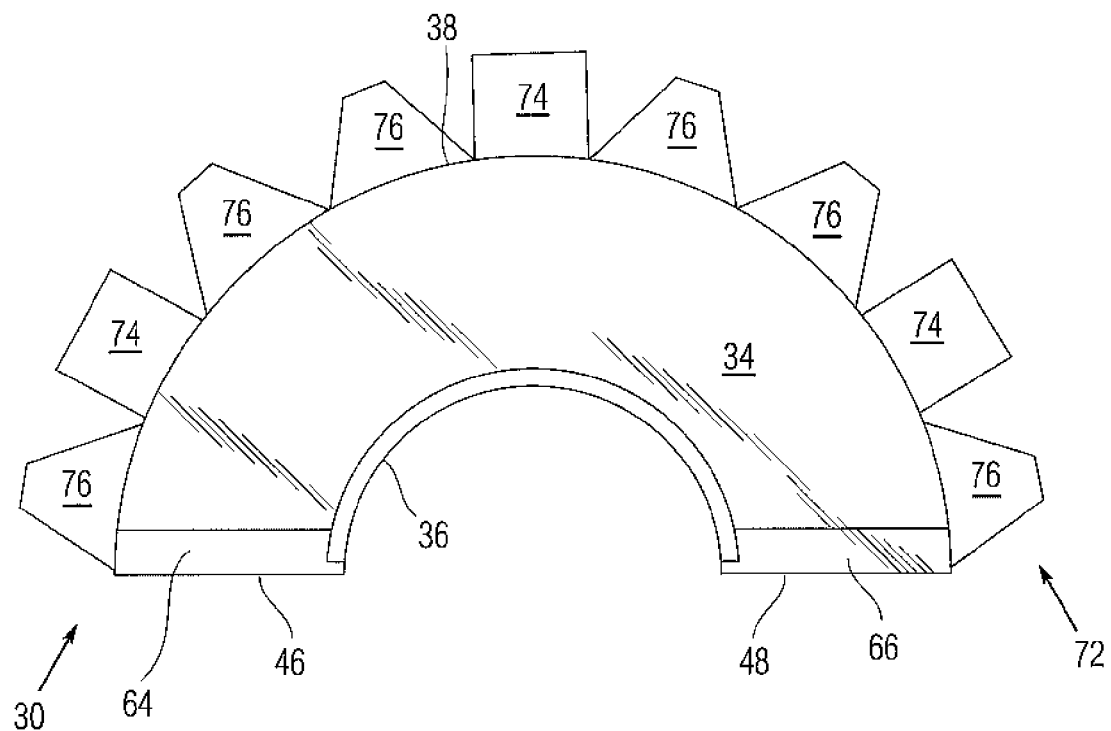
FIG. 18 is a plan view of an alternative protective collar assembly including a protective collar and a barrier in a form of a plurality of geographic configuration according to various embodiments.
Figure 19:
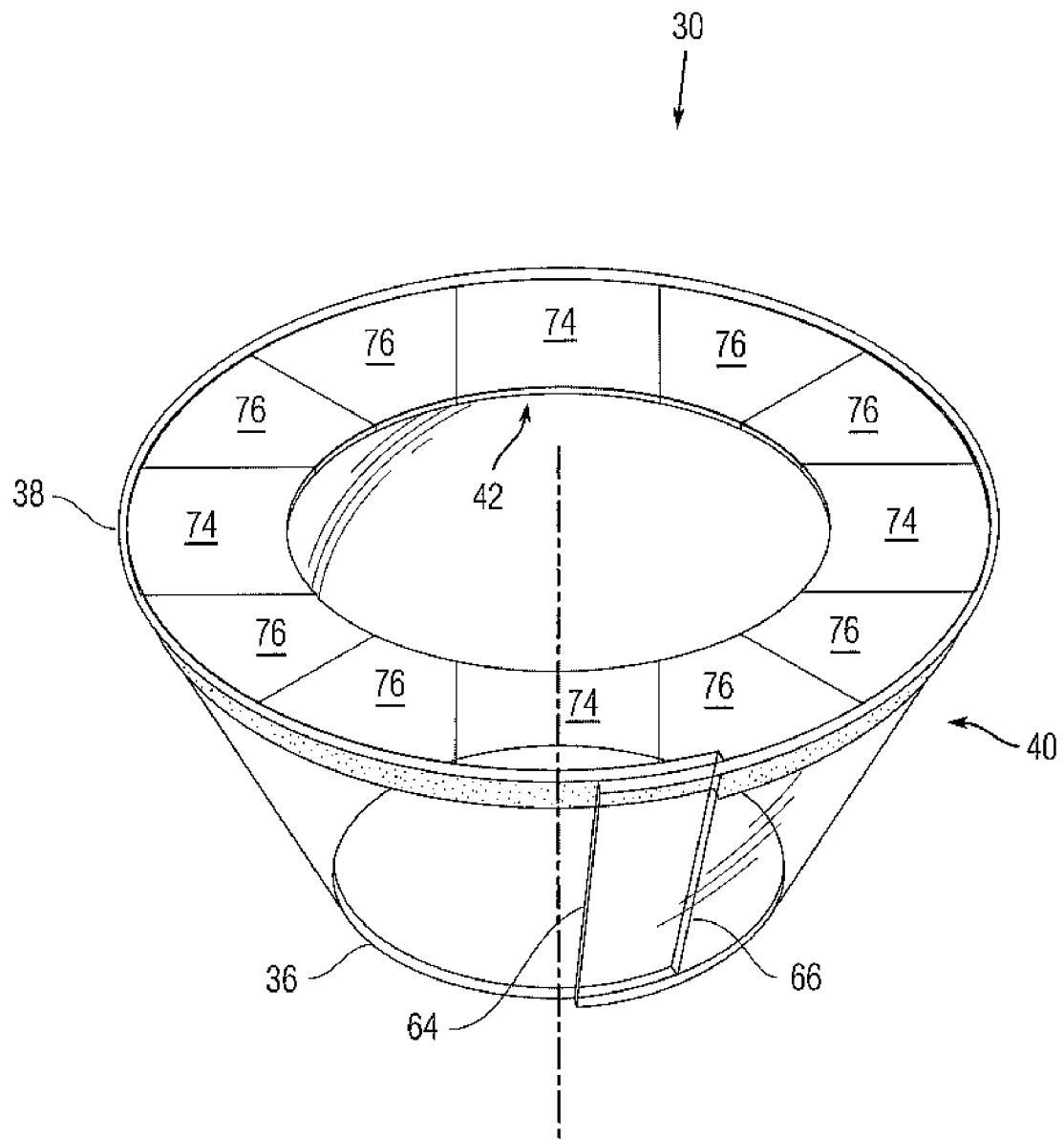
FIG. 19 is a perspective view of a protective collar assembly including the protective collar and the barrier of FIG. 18 after being bent and formed into a shape of a truncated cone according to various embodiments.

As shown in FIGS. 18 and 19, one specific example of such a protective collar and barrier assembly 30 can include a collar-forming sheet 34 and a partition-forming arrangement 72. The partition-forming arrangement 72 can be in any shape capable of forming a barrier 42. For example, the partition-forming arrangement 72 can include a polygon shape, such as a quadrilateral and/or triangle. In one example, the partition-forming arrangement 72 can include a shape that is substantially similar to a square 74 and a shape that is substantially similar to a triangle 76. When the partition-forming arrangement 72 is positioned substantially at an outer arcuated edge 38 and the collar-forming sheet 34 is bent to form the truncated cone 40, the partition-forming arrangement 72 forms a barrier 42 on the outer arcuate edge 38.

Figure 20:
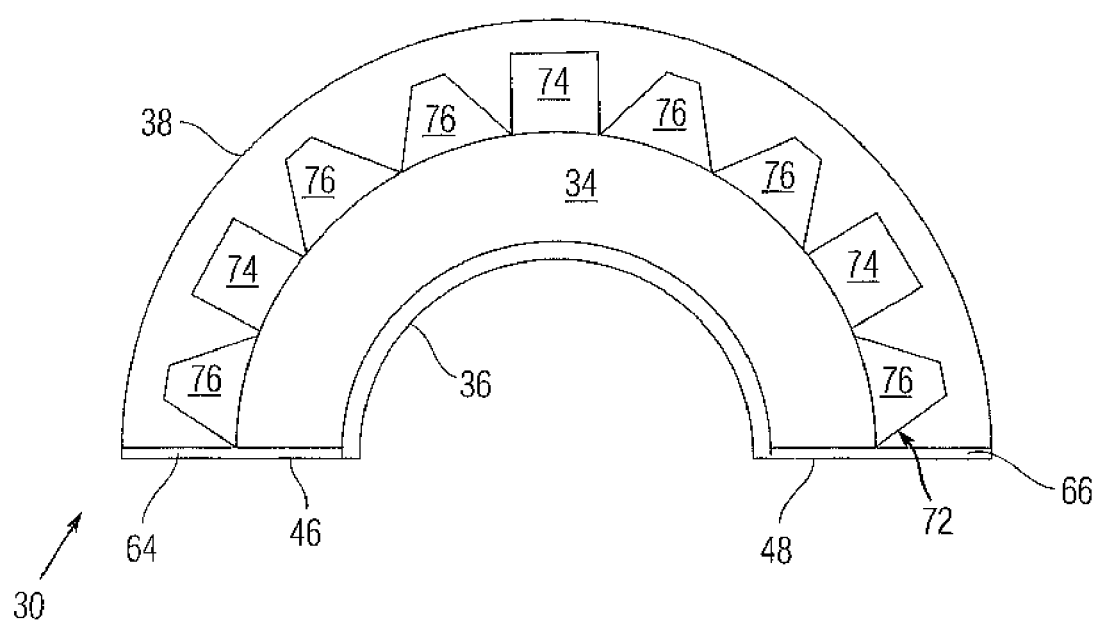
FIG. 20 is a plan view of an alternative protective collar assembly including a protective collar and a barrier in a form of a plurality of geographic configuration according to various embodiments.
Figure 21:
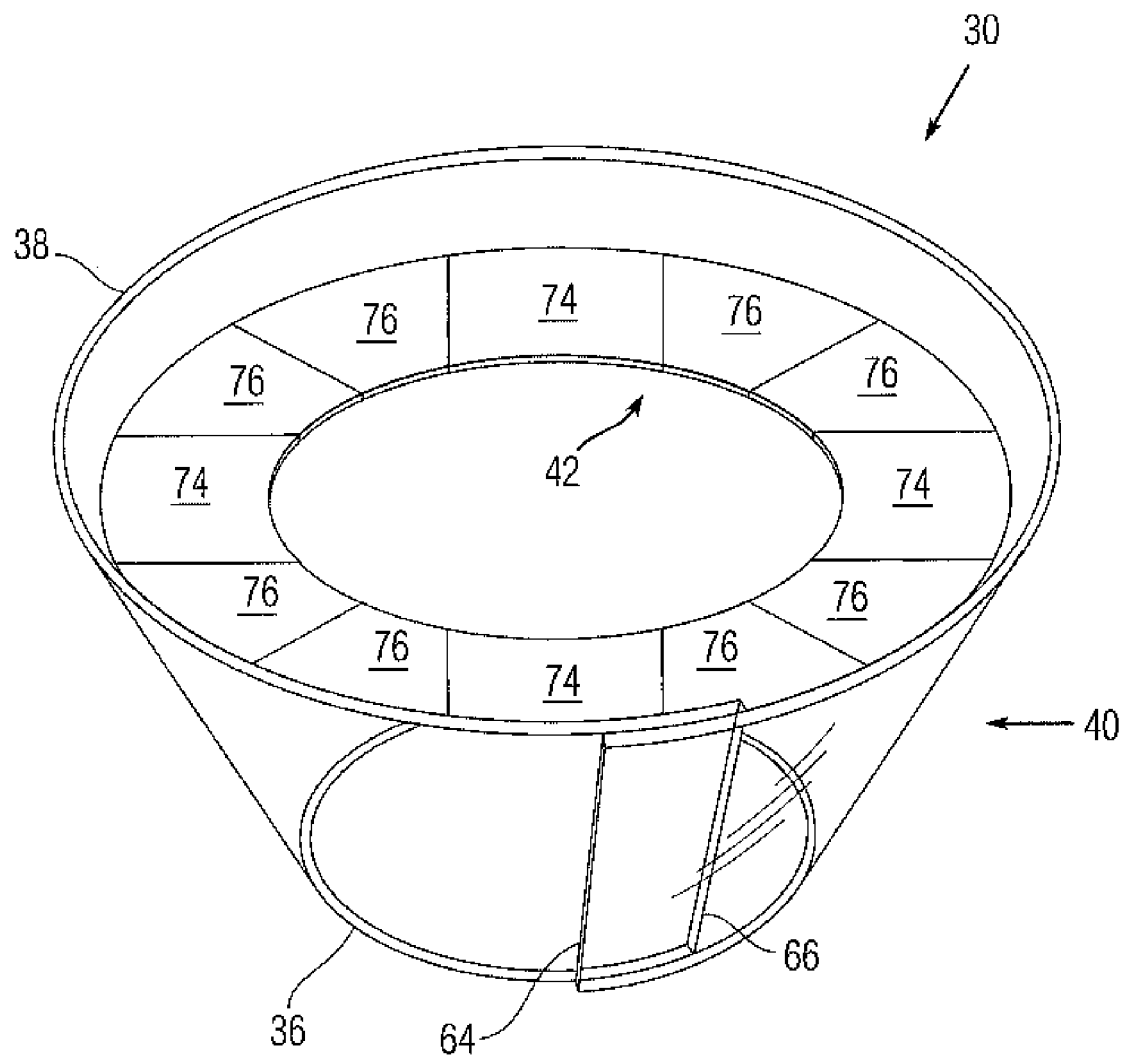
FIG. 21 is a perspective view of a protective collar assembly including the protective collar and the barrier of FIG. 20 after being bent and formed into the shape of a truncated cone according to various embodiments.

Alternatively, as shown in FIGS. 20 and 21, the partition-forming arrangement 72 is positioned between an inner arcuated edge 36 and the outer arcuated edge 38. In this alternative embodiment, the collar-forming sheet 34 is bent to form the truncated cone 40, the partition-forming arrangement 72 forms a barrier 42 on the between the inner arcuated edge 36 and the outer arcuate edge 38.

Figure 22:
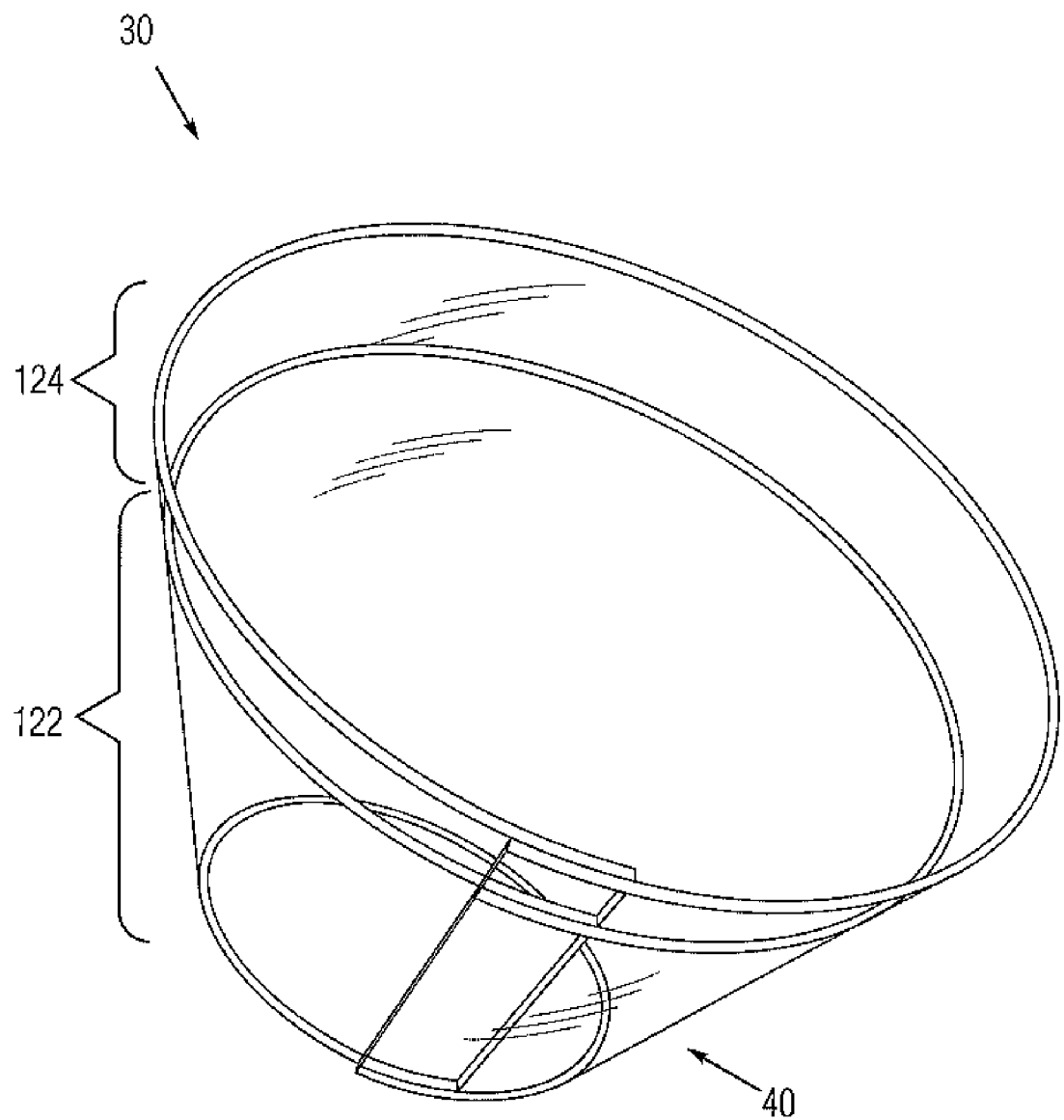
FIG. 22 is a perspective view of an alternative protective collar assembly having a polymeric portion and a textile portion according to various embodiments.

In yet another alternative embodiment, as shown in FIG. 22, a protective collar and barrier assembly 30 can include a first section 122 having the truncated cone 40 made of a polymeric material and a second section 124 made of textile material. The textile material section 124 can be a material that can easily claps on itself or bend when a force is applied thereto. Accordingly, when an animal reaches for its leg or paw, the force applied by the leg or the paw to the second section 124 can cause the second section 124 to collapse or bend inwardly, thereby preventing the animal from reaching its paw or leg. The first section 122 and the second section 124 can be connected to one another by any means known to one of ordinary skill in the art. For example the first section 122 can be connected to the second section 124 by an adhesive material, magnets, and/or hooks and loops. Alternatively, the second section 124 can be sewn to the first section 122.

Collar assemblies of the present invention can be made of any suitable materials. The collar-forming sheet 34 is generally prepared from a material having the desired combination of such properties as resilience, flexibility, weight, density, visual clarity, durability, and color.

The collar assemblies that are substantially visually clear allow the animal to have a broader range of vision, and thereby appear to lessen the anxiety of the animal and improve the collar's effectiveness. Examples of suitable collar-forming sheet 34 meeting the above criteria include, but are not limited to, those prepared from organic and inorganic polymeric substrates, woven and non-woven fabrics, papers such as cardboard, and metals.

Examples of preferred sheet materials include, but are not limited to, polymeric sheet materials such as those prepared from thermoplastic or thermosetting resins capable of forming flexible films, including: thermoplastic resins and polymers such as polyamides (e.g., nylons); polycarbonates (e.g., "Lexan", which is described as a polycarbonate condensation product of bisphenol A and phosgene); polyalkenes and their copolymers (e.g., polyethylenes, polypropylenes, polystyrenes); polyvinyls (e.g., polyvinyl chloride); and polyesters (e.g., polyethylene terephthalate).

As will become apparent to those skilled in the art, collar assemblies can be made in any suitable size and configuration for its intended use, for example for application to animals on the order of birds, rodents, larger laboratory animals such as rabbits, small dogs and cats, larger dogs. For instance the final neck diameter of the fitted, retained collar assembly will generally be on the order of 1 to 5 centimeters for use with birds; on the order of 2 to 10 centimeters for rodents; on the order of 3 to 10 centimeters for larger laboratory animals such as guinea pigs and rabbits; on the order of 5 to 12 centimeters for smaller pets such as dogs and cats, and on the order of 10 to 20 centimeters for larger pets.

Correspondingly, the initial dimensions of the collar assemblies will become readily apparent to those skilled in the art. Dimensions suitable to obtain the desired neck diameter and provide sufficient protection for the animal, e.g., in terms of the length of the inner and outer edges and the width of the sheet. The thickness of the sheet material will depend on the properties of the material chosen including the desired flexibility, resilience, and strength. Suitable thicknesses generally range on the order of about 0.1 mm to about 1 mm, and preferably from about 0.2 mm to about 0.8 mm.

Collar assemblies of the present teachings can optionally include other structures and parts to the extent such structures or parts do not significantly interfere with the intended use or function of the collar assemblies. For instance, collar assemblies will preferably have padding on the inner edge of the sheet material, in order to pad points of contact between the fitted collar and the animal's neck. Padding can provide a fit that is snugger, and can help alleviate or avoid chafing of the animal's neck by repeated rubbing of the collar.

Any material suitable for the purpose of padding the collar assembly can be used, e.g., in terms of cushioning, durability, availability, and cost. Many commercially available materials include various forms of rubber, silicone, sponge, foams, and the like.

Padding can be applied in any suitable manner, e.g., it can be adhered, crimped, clamped, integrally molded, and/or physically retained (e.g., within a groove).

Collar assemblies can also optionally be provided with means for attaching (i.e., "anchoring") the collar assemblies to another collar, e.g., to the animal's own collar, in order to ensure that the animal cannot force the entire collar assembly off its head by repeated pressure with its paw.

Collar assemblies of the present teachings can be used in any situation in which limited contact between an animal's head or mouth and the rest of its body is desired. For example, collar assemblies can be used for the post-surgical protection of incisions, wound and dressing protection, the protection of dermatological test sites, and the management of dermatological problems. Particularly suitable applications include the protection after eye and ear surgical procedures, as well as after limb and abdomen surgical procedures.

The collar assemblies of the present teachings can be made to be relatively inexpensive, durable, and are fitted and intended for short-term use on a single animal. Accordingly, they can be disposed after use or can be kept for future use.

EXAMPLES

Example 1

A two year old Maltese, named Bella, weighing approximately 5.5 lbs. had luxating patella on her left and right legs. A surgery was performed to correct the luxating patella on both legs at the same time. A total of 12 stables were placed on the dog's legs and arranged to reconnect the cut tissues that resulted from the surgical procedure. To prevent the dog from reaching its patella area TRIMLINE veterinary soft recovery collar having depths of 4 inches, 5 inches, and 6.5 inches were purchased from TRIMLINE Manufacturing Co., Inc., located at Boca Raton, Fla., and were positioned around the dog's neck to determine the comfort level of the dog wearing the collar, ability of the dog to reach its legs, ability of the dog to reach its food placed in a bowel, ability of the dog to walk on a flat surface area, ability of the dog to clime up and down a stair case having 14 steps, and the ability of the dog to tolerate the weight of the collar. The TRIMLINE veterinary soft recovery collars were then replaced with Elizabethan collars (e-collar), manufactured by 3M located at St. Paul, Minn., having sizes 8 (a cone length of 3.5 inches), 12 (a cone length of 4.7 inches), and 17 (a cone length of 6.7 inches). Similarly Kong e-collars, manufactured by KONG Co. located at Golden, Colo., having sizes 8 (a cone length of 4.5 inches), 9 (a cone length of 5 inches), and 12 (a cone length of 7 inches) were also tested. The test results are shown in Table I.

TABLE I

| E-collar Size | Comfort Level | Reach Leg | Reach Food | Walk of a Flat Surface | Clime Up or Down a Stair Case | Tolerate Weight of Cone |
|---|---|---|---|---|---|---|
| 4" soft collar | Good | Yes | Yes | Yes | Yes | Yes |
| 5" soft collar | Okay | Yes | Yes | Yes | Yes | Yes |
| 6.5" soft collar | Bad | Yes | Yes | No | No | Yes |
| 8 by 3M | Good | Yes | Yes | Yes | Yes | Yes |
| 12 by 3M | Okay | Yes | Yes | Yes | Yes | Yes |
| 17 by 3M | Bad | No | No | No | No | No |
| 8 by KONG | Good | Yes | Yes | Yes | Yes | Yes |
| 9 by KONG | Good | Yes | Yes | Yes | Yes | Yes |
| 12 by KONG | Bad | No | No | No | No | No |

With respect to the soft collars, as shown in Table. I, the 4" and 5" soft collars were comfortable; however, the dog was able to push and fold the soft collars to reach her knees. The 6.5" collar was too large for the dog. A portion of the collar was in constant contact with the floor and caused the dog to trip over that portion, thereby preventing the dog from walking on a flat surface or a stair case.

With respect to the e-collars manufactured by 3M, as shown in Table I, the size 8 e-collar was comfortable and allowed the dog to reach her food, walk on a flat surface or a stair case and tolerate the weight of the e-collar. However, the dog was able to twist her body in a manner that allowed the dog to reach the knee area of her leg with her mouth. Similarly, the size 12 collar had the same deficiency as the size 8 collar (i.e., the dog was able to twist her body in a way to reach her leg with her mouth). Additionally, it was more challenging for the dog to reach her food. Furthermore, when walking up a stair case, the edge of the collar was continuously caught on the edge of the stair case. This inconvenience made the dog to keep her head up as much as possible so that the edge of the collar cleared the edge of the stair case. When the size 17 collar was arranged around the dog's neck, it prevented the dog from reaching her leg. However, the collar was so large that she easily pulled the collar off of her head. Moreover, the collar was so heavy for her neck that prevented her from lifting her head to clear any objects in front of her. Moreover, at meal times, in order to reach her food, the dog was forced to place the entire cone over her food bowel and push herself up in a vertical position, such that in inner edge of the cone supported her entire weight.

With respect to e-collars manufactured by KONG Corp., the sizes 8 and 9 of KONG e-collars had the same advantages and disadvantages as the sizes 8 and 12 of the e-collar manufactured by 3M. Furthermore, size 12 of the e-collar manufactured by KONG had the same disadvantages as the size 17 of the e-collar manufactured by 3M.

Example 2

Two e-collars sizes 8 and 9 manufactured by KONG Co. were purchased. The size 8 e-collar was arranged around the neck of the dog in Example 1. A barrier of the present teachings was then positioned approximately 1 inch inside the e-collar from its outer arcuate edge. The dog with the size 8 e-collar having the barrier was observed for approximately 24 hours. After 24 hours, the size 8 e-collar having the barrier was replaced with the size 9 e-collar. A barrier of the present teachings was then positioned approximately on the outer arcuate edge of the e-collar. The dog with the size 9 e-collar having the barrier was observed for approximately 24 hours. After 24 hours, the size 9 e-collar was replaced with a size 8 e-collar having an extension made from a textile material having a truncated shape. The Textile material was arranged approximately on the outer arcuate edge of the size 8 e-collar. The dog with the size 8 e-collar having the truncated shape with the extension was observed for approximately 24 hours. The test results are shown in Table II.

TABLE I

| E-collar Size | Comfort Level | Reach Leg | Reach Food | Walk of a Flat Surface | Climb Up or Down a Stair Case | Tolerate Weight of Cone |
|---|---|---|---|---|---|---|
| 8 with Barrier positioned 1 inch inside e-collar | Good | No | Yes | Yes | Yes | Yes |
| 9 with Barrier positioned on outer arcuate edge of e-collar | Good | No | Yes | Yes | Yes | Yes |
| 9 with Textile Material | Ok | No | Yes | Yes | Yes | Yes |

With respect to the size 8 collar having a barrier positioned approximately 1 inch inside the e-collar, as shown in Table II, the size 8 collar having the barrier was comfortable, allowed the dog to reach her food, walk on a flat surface or a stair case, and was light in weight. Moreover, the dog was unable to reach her knee, even when she twisted her body.

As shown in Table II, the size 9 collar having the barrier positioned approximately on the outer arcuate edge of the e-collar was comfortable, allowed the dog to reach her food, walk on a flat surface or a stair case, and was light in weight. Moreover, the dog was unable to reach her knee, even when she twisted her body. The barrier arranged proximate to the outer arcuate edge of the e-collar, prevented her from bringing her knee to the opening of the e-collar even when she twisted her body.

As shown in Table II, the size 9 collar having a truncated textile material positioned approximately on the outer arcuate edge of the e-collar had an average comfort level. Additionally, the textile material bent when the dog reached for her food; therefore, allowed the dog to reach her food. The dog was able to walk on a flat surface and a stair case. Moreover, the dog was unable to reach her knee because when the knee came in contact with the textile material, the textile material bent inward to prevent the dog's mouth from reaching her knee.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A protective collar and barrier assembly comprising:
   a collar-forming sheet having inner and outer arcuate edges generally concentric about a common axis, the inner and outer arcuate edges extending between a first end and a second end of the collar-forming sheet, the collar-forming sheet being adapted to be bent to form a shape of a truncated cone with a substantial portion of the inner edge adapted to fit around a neck of an animal; and
   a barrier positionable at a location from inside the outer arcuate edge to a predetermined distance away from the inner arcuate edge of the truncated cone and capable of preventing the animal from reaching its extremities.

2. The protective collar and barrier assembly of claim 1, wherein the barrier forms a flange arranged to reduce a diameter of the truncated cone.

3. The protective collar and barrier assembly of claim 1, wherein the collar forming sheet comprises at least a row of openings extending from about the first end to about the second end and capable of receiving and securing the barrier when the collar forming sheet is formed into a shape of the truncated cone.

4. The protective collar and barrier assembly of claim 3, wherein the barrier comprises a first end portion that is received by a first opening of the row of openings and a second end portion that is received by a second opening of the row of the openings, wherein the first opening and the second opening in the collar-forming sheet are positioned substantially opposite to one another.

5. The protective collar and barrier assembly of claim 1, wherein the barrier comprises a plurality of different geometrical configurations arranged such that when the collar-forming sheet is formed into the truncated cone, the different geometrical configurations form a partition that is capable of preventing the animal from reaching its extremities.

6. The protective collar and barrier assembly of claim 1, further comprising a clip-like fastener having a top portion and a bottom portion.

7. The protective collar and barrier assembly of claim 6, wherein the clip-like fastener is a part of one of the (i) barrier and (ii) the collar-forming sheet.

8. The protective collar and barrier assembly of claim 6, wherein the clip-like fastener is removably connected to the outer arcuate edge of the collar-forming sheet.

9. The protective collar and barrier assembly of claim 6, wherein the barrier is connected to at least one of the (i) top portion and (ii) between the top portion and bottom portion of the clip-like fastener.

10. The protective collar and barrier assembly of claim 1, wherein the barrier is removably connected to the truncated cone by a fastener.

11. The protective collar and barrier assembly of claim 10, wherein the fastener is a hook and loop type fastener.

12. The protective collar and barrier assembly of claim 1, wherein the barrier is in a shape of a cone and extends from a portion of the truncated cone.

13. The protective collar and barrier assembly of claim 1, wherein the barrier is made from a textile material, polymeric material, or a combination thereof.

14. The protective collar and barrier assembly of claim 1, wherein the barrier is removably connected to the truncated cone by an adhesive, a fastener, a clip, hooks and loops, or a combination thereof.

15. A protective collar and barrier assembly comprising:
    an animal protective collar-forming sheet having inner and outer arcuate edges generally concentric about a common axis, the edges extending between a first end and a second end of the animal protective collar forming sheet, the animal protective collar-forming sheet being adapted to be bent to form a geometrically shaped configuration that can be arranged to fit around a neck of an animal; and
    a barrier positionable at a location from inside the outer arcuate edge to a predetermined distance away from the inner arcuate edge of the geometrically-shaped configuration and capable of preventing the animal from reaching its extremities.

* * * * *